United States Patent
Lindskog et al.

(10) Patent No.: US 10,135,638 B2
(45) Date of Patent: Nov. 20, 2018

(54) PROTECTION OF RANGING SOUNDING SIGNALS FROM PHYSICAL LEVEL ATTACKS

(71) Applicant: QUALCOMM Incorporated, San Diego, CA (US)

(72) Inventors: Erik David Lindskog, Cupertino, CA (US); Ning Zhang, Saratoga, CA (US); Naveen Kumar Kakani, Irving, TX (US); Alireza Raissinia, Monte Sereno, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/943,243

(22) Filed: Apr. 2, 2018

(65) Prior Publication Data
US 2018/0287826 A1    Oct. 4, 2018

Related U.S. Application Data

(60) Provisional application No. 62/481,544, filed on Apr. 4, 2017.

(51) Int. Cl.
*H04W 84/12* (2009.01)
*H04L 25/02* (2006.01)

(52) U.S. Cl.
CPC ...... *H04L 25/0226* (2013.01); *H04L 25/0204* (2013.01); *H04W 84/12* (2013.01)

(58) Field of Classification Search
CPC ............. H04L 25/0224; H04L 25/0226; H04L 25/0048; H04L 25/0057; H04W 84/12
(Continued)

(56) References Cited

U.S. PATENT DOCUMENTS

2006/0251183 A1* 11/2006 Soffer ................. H04B 7/10
                                                    375/267
2010/0111220 A1    5/2010 Rouquette-Leveil et al.
(Continued)

OTHER PUBLICATIONS

"IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput; IEEE Std 802.11n-2009 (Amendment to IEEE Std 802 .Nov. 2007)", IEEE Standard, IEEE, Piscataway, NJ, USA, Oct. 29, 2009 (Oct. 29, 2009), pp. 1-565, XP017694836, ISBN: 978-0-7381-6046-7.
(Continued)

*Primary Examiner* — Kevin Kim
(74) *Attorney, Agent, or Firm* — Holland & Hart LLP/Qualcomm

(57) ABSTRACT

Generally, the described techniques provide for protection mechanisms for sounding training signals transmitted between wireless devices when performing ranging sounding estimation. For example, sounding training signals may be encoded to include a sequence of phase rotations or cyclic shifts to protect the sounding training signal from peer devices. In some cases, encoding information associated with a long training field (LTF) may be transmitted either before or after the LTF is transmitted. Additionally or alternatively, a time delay may be introduced to the sounding training signal, where timing information may be removed from one or more fields of the sounding training signal and the time delay may be appended to an interframe spacing. Alternatively, a frame may be split into multiple frames with the sounding training signal in a first frame, and timing information in a second frame that is offset in time from the first frame.

30 Claims, 24 Drawing Sheets

(58) Field of Classification Search
USPC .................................................. 375/260, 295
See application file for complete search history.

(56) References Cited

U.S. PATENT DOCUMENTS

| | | |
|---|---|---|
| 2013/0315219 A1 | 11/2013 | Cheong et al. |
| 2016/0286551 A1* | 9/2016 | Lee .......................... H04L 27/26 |
| 2018/0131540 A1* | 5/2018 | Malik .................. H04L 27/2628 |
| 2018/0249437 A1* | 8/2018 | Lindskog .............. H04W 64/00 |

OTHER PUBLICATIONS

International Search Report and Written Opinion—PCT/US2018/026030—ISA/EPO—dated Jun. 22, 2018.
Miller R., et al., "On the Vulnerabilities of CSI in MIMO Wireless Communication Systems", IEEE Transactions on Mobile Computing, IEEE Service Center, Los Alamitos, CA. US, vol. 11, No. 8, Aug. 1, 2012 (Aug. 1, 2012), XP011470166, pp. 1386-1398, ISSN: 1536-1233, DOI: 10.1109/TMC.2011.156.

* cited by examiner

PROTECTION OF RANGING SOUNDING SIGNALS FROM PHYSICAL LEVEL ATTACKS

CROSS REFERENCES

The present application for patent claims priority to U.S. Provisional Patent Application No. 62/481,544 by Lindskog et al., entitled "Protection of Ranging Sounding signals From Physical Level Attacks," filed Apr. 4, 2017, assigned to the assignee hereof, the entirety of which is hereby expressly incorporated by reference.

BACKGROUND

The following relates generally to wireless communication, and more specifically to protection of ranging sounding signals from physical level attacks.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

In some cases, wireless devices may use transmitted signals to determine a distance from other wireless devices. For example, a round trip time (RTT) of a sequence of ranging messages sent between a transmitting device and a receiving device may be used to calculate a distance between the two devices. Due to signaling used for such ranging message exchanges, however, a peer device may impersonate a device and interfere with ranging measurements. This may cause a receiver to calculate a distance from the transmitter that is less than the actual distance and create additional problems based on this incorrect distance. It may be desirable to implement various protection mechanisms to provide security from attacks on devices related to ranging measurements.

SUMMARY

The described techniques relate to methods, systems, devices, or apparatuses that support protection of ranging sounding signals from attacks, such as physical level attacks. Generally, the described techniques provide for protection mechanisms for sounding training signals sent between wireless devices when performing ranging sounding estimation processes. For example, a sounding training signal may employ protection through the use of an encoding scheme that applies a sequence of phase rotations to the sounding training signal. In such cases, a receiver (e.g., a receiving wireless device) may receive an indication of the phase rotations that are then applied to a channel estimate used for a sounding ranging estimation with the transmitter (e.g., a transmitting wireless device). In some examples, the indication of the phase rotations may be signaled to the receiver after a long training field (LTF) of the sounding training signal. Additionally or alternatively, the transmitter may apply an encoding scheme to the sounding training signal that results in a cyclic delay shift of the sounding training signal. In such cases, the receiver may receive an indication of the cyclic delay shift, and compensate for a delay of a corresponding channel estimate using the cyclic delay shift to perform sounding ranging estimation. Peer devices (e.g., attacker devices) may not be able to obtain information associated with the encoding schemes used for the transmission of the sounding training signals, and also may not interfere with the sounding ranging estimation between the transmitter and receiver.

In some examples, the sounding training signal may employ a time shift that is only known to the transmitter and receiver. In such cases, the time shift may be obtained by removing timing information from one or more fields of a frame, and may be appended to or included in a frame spacing before the sounding training signal. Alternatively, an original frame may be split into multiple frames, and the timing information may be included in a later frame of the original frame that is offset from a first frame of the original frame by a time offset, where the time offset is only known to the transmitter and receiver. The peer device may be unable to determine the time offset and may likewise be unable to interfere with sounding ranging estimations between the transmitter and receiver.

A method of wireless communication is described. The method may include encoding an LTF of a sounding training signal, wherein the encoding comprises applying a phase rotation to the LTF, configuring an extension field of the sounding training signal to include an indication of the encoding, and transmitting the sounding training signal including the encoded LTF and the configured extension field.

An apparatus for wireless communication is described. The apparatus may include means for encoding an LTF of a sounding training signal, wherein the encoding comprises applying a phase rotation to the LTF, means for configuring an extension field of the sounding training signal to include an indication of the encoding, and means for transmitting the sounding training signal including the encoded LTF and the configured extension field.

Another apparatus for wireless communication is described. The apparatus may include a processor, memory in electronic communication with the processor, and instructions stored in the memory. The instructions may be operable to cause the processor to encode an LTF of a sounding training signal, wherein the encoding comprises applying a phase rotation to the LTF, configure an extension field of the sounding training signal to include an indication of the encoding, and transmit the sounding training signal including the encoded LTF and the configured extension field.

A non-transitory computer-readable medium for wireless communication is described. The non-transitory computer-readable medium may include instructions operable to cause a processor to encode an LTF of a sounding training signal, wherein the encoding comprises applying a phase rotation to the LTF, configure an extension field of the sounding training signal to include an indication of the encoding, and transmit the sounding training signal including the encoded LTF and the configured extension field.

In some examples of the method, apparatus, and non-transitory computer-readable medium described above, the extension field may be transmitted after the LTF. In some examples of the method, apparatus, and non-transitory computer-readable medium described above, the LTF may be encoded using the phase rotation applied to an LTF base sequence, and wherein the phase rotation may be from a sequence of phase rotations associated with different phase rotations of respective tones.

Some examples of the method, apparatus, and non-transitory computer-readable medium described above may further include processes, features, means, or instructions for transmitting a second LTF of a second sounding training signal, the second LTF encoded using a second phase rotation from the sequence of phase rotations, wherein the second phase rotation may be different than the phase rotation.

In some examples of the method, apparatus, and non-transitory computer-readable medium described above, the extension field of the sounding training signal comprises a packet extension field modulated according to a legacy portion of a frame. In some examples of the method, apparatus, and non-transitory computer-readable medium described above, the sounding training signal may be included in a null data packet frame.

A method of wireless communication is described. The method may include receiving an LTF of a sounding training signal, determining a channel estimate based at least in part on the sounding training signal, receiving an extension field of the sounding training signal, identifying a phase rotation of the LTF based at least in part on the received extension field, applying the identified phase rotation to the channel estimate to obtain a phase-compensated channel estimate based at least in part on the sounding training signal, and transmitting a signal based on the phase-compensated channel estimate.

An apparatus for wireless communication is described. The apparatus may include means for receiving an LTF of a sounding training signal, means for determining a channel estimate based at least in part on the sounding training signal, means for receiving an extension field of the sounding training signal, means for identifying a phase rotation of the LTF based at least in part on the received extension field, means for applying the identified phase rotation to the channel estimate to obtain a phase-compensated channel estimate based at least in part on the sounding training signal, and means for transmitting a signal based on the phase-compensated channel estimate.

Another apparatus for wireless communication is described. The apparatus may include a processor, memory in electronic communication with the processor, and instructions stored in the memory. The instructions may be operable to cause the processor to receive an LTF of a sounding training signal, determine a channel estimate based at least in part on the sounding training signal, receive an extension field of the sounding training signal, identify a phase rotation of the LTF based at least in part on the received extension field, apply the identified phase rotation to the channel estimate to obtain a phase-compensated channel estimate based at least in part on the sounding training signal, and transmit a signal based on the phase-compensated channel estimate.

A non-transitory computer-readable medium for wireless communication is described. The non-transitory computer-readable medium may include instructions operable to cause a processor to receive an LTF of a sounding training signal, determine a channel estimate based at least in part on the sounding training signal, receive an extension field of the sounding training signal, identify a phase rotation of the LTF based at least in part on the received extension field, apply the identified phase rotation to the channel estimate to obtain a phase-compensated channel estimate based at least in part on the sounding training signal, and transmit a signal based on the phase-compensated channel estimate.

Some examples of the method, apparatus, and non-transitory computer-readable medium described above may further include processes, features, means, or instructions for performing a ranging sounding estimation based at least in part on an impulse response associated with the phase-compensated channel estimate. In some examples of the method, apparatus, and non-transitory computer-readable medium described above, the LTF may be encoded using the phase rotation applied to an LTF base sequence, and wherein the phase rotation may be from a sequence of phase rotations associated with different phase rotations of respective tones.

Some examples of the method, apparatus, and non-transitory computer-readable medium described above may further include processes, features, means, or instructions for receiving a second LTF of a second sounding training signal, the second LTF encoded using a second phase rotation from the sequence of phase rotations, wherein the second phase rotation may be different than the phase rotation.

In some examples of the method, apparatus, and non-transitory computer-readable medium described above, the LTF may be encoded using the phase rotation applied to tones of a set of modulation symbols of the sounding training signal, and wherein the phase rotation may be from a sequence of phase rotations associated with different phase rotations of respective tones.

Some examples of the method, apparatus, and non-transitory computer-readable medium described above may further include processes, features, means, or instructions for storing the determined channel estimate before receiving the extension field of the sounding training signal. In some examples of the method, apparatus, and non-transitory computer-readable medium described above, the extension field of the sounding training signal comprises a packet extension field modulated according to a legacy portion of a frame.

Some examples of the method, apparatus, and non-transitory computer-readable medium described above may further include processes, features, means, or instructions for demodulating the packet extension field based at least in part on a legacy LTF of the legacy portion of the frame. In some examples of the method, apparatus, and non-transitory computer-readable medium described above, the sounding training signal may be included in a null data packet frame.

DETAILED DESCRIPTION

Devices within a wireless communications system may benefit from knowledge of the distance between themselves and other devices of interest. In some cases, this knowledge may be enabled through the use of round trip time (RTT) computations. For example, two devices may transmit time-stamped signals that allow one or both of the devices to compute a distance based on propagation time of the signals. In some cases, however, an attacker (e.g., another wireless device) may interfere with the RTT computations by mimicking a transmission or by otherwise impacting the RTT computations. For example, an attacker may transmit a time-advanced signal or overlay a portion of a signal so as to trick a first device into determining that a second device, with which the first device is attempting to communicate, is closer than it is in reality. Protections against such attacks may be desired.

As described herein, various physical layer protection schemes may be used alone or in any combination to combat potential attacks. For example, sounding training signals may be encoded to include a sequence of phase rotations or cyclic shifts to protect the sounding training signal from peer devices. In some cases, encoding information associated with a long training field (LTF) may be transmitted either before or after the LTF is transmitted. Additionally or alternatively, a time delay may be introduced to the sounding training signal, where timing information may be removed from one or more fields of the sounding training signal and the time delay may be appended to an interframe spacing. Additionally or alternatively, a frame may be split into multiple frames with the sounding training signal in a first frame, and timing information in a second frame that is offset in time from the first frame.

Aspects of the disclosure are initially described in the context of a wireless communications system. Aspects of the disclosure are then described in the context of process flows and example packet formats. Aspects of the disclosure are further illustrated by and described with reference to apparatus diagrams, system diagrams, and flowcharts that relate to protection of ranging sounding signals from physical level attacks.

Figure 1:
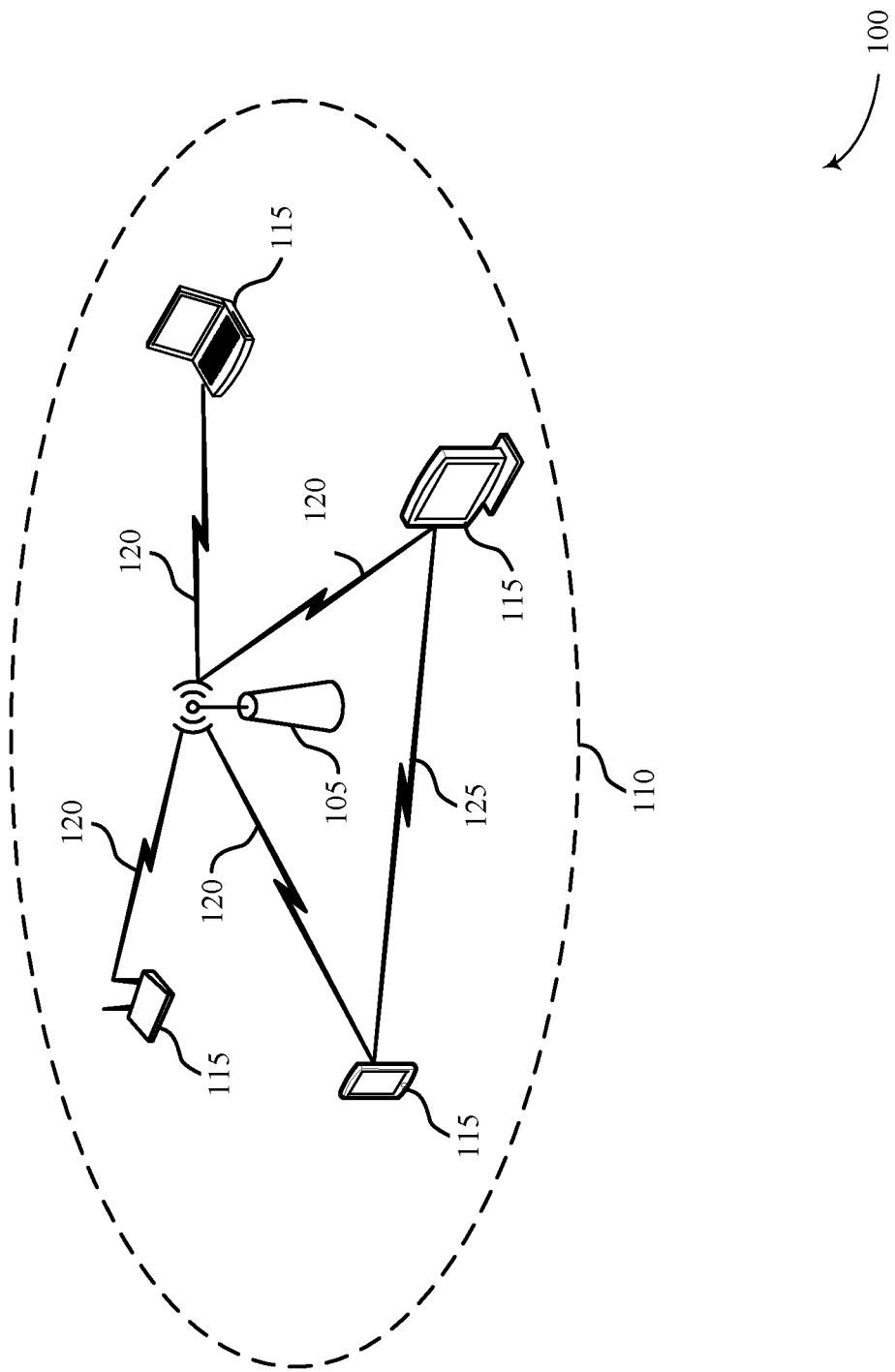
FIG. 1 illustrates a wireless communications system that supports protection of ranging sounding signals from physical level attacks in accordance with aspects of the present disclosure.

FIG. 1 illustrates a wireless communications system that supports protection of ranging sounding signals from physical level attacks in accordance with aspects of the present disclosure. The wireless communications system may include a wireless local area network (WLAN) 100 (also known as a Wi-Fi network) configured in accordance with various aspects of the present disclosure. The WLAN 100 may include wireless devices such as an access point (AP) 105 and multiple associated stations (STAs) 115, which may represent various devices such as mobile stations, personal digital assistant (PDAs), other handheld devices, netbooks, notebook computers, tablet computers, phones, laptops, display devices (e.g., TVs, computer monitors, etc.), printers, key fobs (e.g., for passive keyless entry and start (PKES) systems), etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

Some types of STAs 115 may provide for automated communication. Automated wireless devices may include those implementing internet-of-things (IoT) communication, Machine-to-Machine (M2M) communication, or machine type communication (MTC). IoT, M2M, or MTC may refer to data communication technologies that allow devices to communicate without human intervention. For example, IoT, M2M, or MTC may refer to communications from STAs 115 that integrate sensors or meters to measure or capture information and relay that information to a central server or application program that can make use of the information or present the information to humans interacting with the program or application.

Some of the STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

In some cases, the STAs 115 may form networks without APs 105 (e.g., or equipment other than the STAs 115 themselves). One example of such networks is an ad hoc network (or wireless ad hoc network). Ad hoc networks may alternatively be referred to as mesh networks or peer-to-peer (P2P) connections. In some cases, ad hoc networks may be implemented within a larger wireless network (e.g., a WLAN 100). For example, two STAs 115 may communicate via a communication link 125 regardless of whether both STAs 115 are in the same coverage area (e.g., served by the same AP 105). In such an ad hoc system, one or more of the STAs 115 may assume the role filled by the AP 105 in a BSS (e.g., may coordinate transmissions within the ad hoc network). Such a STA 115 may be referred to as a group owner (GO).

The STAs 115 may communicate (e.g., via communication link 120) according to the WLAN radio and baseband protocol for physical and medium access control (MAC) layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, 802.11az, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands, such as shared licensed frequency bands, where multiple operators may have a license to operate in the same or overlapping frequency band or bands.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (e.g., AP 105) to shape and/or steer an overall antenna beam in the direction of a target receiver (e.g., a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (e.g., or antenna port) such that the desired beamforming effects are achieved. In some cases, these weights may be determined before beamforming can be employed. For example, the transmitter (e.g., the AP 105) may transmit one or more sounding packets to the receiver in order to determine CSI.

WLAN 100 may further support multiple-input, multiple-output (MIMO) wireless systems. Such systems may use a transmission scheme between a transmitter (e.g., AP 105) and a receiver (e.g., a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (e.g., each transmission may be beamformed differently). The receiver (e.g., STA 115) may try multiple beams (e.g., antenna subarrays) while receiving the signals.

While the STAs 115 are capable of communicating with each other through the AP 105 using communication links 120, STAs 115 can also communicate directly with each other via direct communication links 120 (e.g., direct wireless communication links). Direct communication links 120 can occur between STAs 115 regardless of whether respective STAs 115 are connected to the AP 105. Examples of direct communication links 120 include Wi-Fi Direct connections, connections established by using a Wi-Fi Tunneled Direct Link Setup (TDLS) link, and other peer-to-peer (P2P) group connections.

WLAN protocol data units (PDUs) may be transmitted over a radio frequency spectrum band that, in some examples, may include multiple sub-bands. In some cases, the radio frequency spectrum band may have a bandwidth of 80 MHz, and each of the sub-bands may have a bandwidth of 20 MHz. Transmissions to/from STAs 115 and APs 105 oftentimes include control information within a header that is transmitted prior to data transmissions. The information provided in a header is used by a device to decoded the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control, channel estimation, etc. The legacy preamble may also be used to maintain compatibility with legacy devices (e.g., devices operating in accordance with an earlier version of a wireless standard). A packet also may include a payload after the preamble.

High efficiency (HE) WLAN preambles can be used to schedule multiple devices, such as STAs 115, for single-user simultaneous transmission (e.g., single-user orthogonal frequency division multiple access (SU-OFDMA)) and/or MU-MIMO transmissions. In one example, an HE WLAN signaling field (e.g., HE-SIG-B) may be used to signal a resource allocation pattern to multiple receiving STAs 115. The HE WLAN signaling field includes a common user field that is decodable by multiple STAs 115, the common user field including a resource allocation field. The resource allocation field indicates resource unit distributions to the multiple STAs 115 and indicates which resource units in a resource unit distribution correspond to MU-MIMO transmissions and which resource units correspond to orthogonal frequency division multiple access (OFDMA) single-user transmissions. The HE WLAN signaling field also includes, subsequent to the common user field, dedicated user fields that are assigned to certain STAs 115. The HE WLAN signaling field is transmitted with a WLAN preamble to the multiple STAs 115.

The HE WLAN preamble may include any of a repeated legacy WLAN field (e.g., an RL-SIG field), a first WLAN signaling field (e.g., a first high efficiency WLAN signaling field such as HE-SIG-A), a second WLAN signaling field (e.g., a second HE WLAN signaling field such as HE-SIG-B), a WLAN STF (e.g., a HE WLAN STF), and at least one WLAN LTF (e.g., at least one HE WLAN LTF). The HE WLAN preamble may enable an AP 105 to simultaneously transmit to multiple STA 115 (e.g., MU-MIMO) and may also enable an AP 105 to allocate resources to multiple STAs 115 for uplink/downlink transmissions (e.g., SU-OFDMA). The HE WLAN preamble may use a common signaling field and one or more dedicated (e.g., station-specific) signaling fields to schedule resources and to indicate the scheduling to other WLAN devices.

In some cases, aspects of the MIMO transmissions and/or beamformed transmissions may vary based on a distance between transmitter (e.g., AP 105) and receiver (e.g., STA 115). WLAN 100 may otherwise generally benefit from AP 105 having information regarding the location of the various STAs 115 within coverage area 110. In some examples, relevant distances may be computed using RTT-based ranging procedures.

As an example, WLAN 100 may offer such functionality that produces accuracy on the order of one meter (e.g., or even centimeter-level accuracy). The same (or similar) techniques employed in WLAN 100 may be applied across other radio access technologies (RATs). For example, such RTT-based ranging functionality may be employed in developing "relative geofencing" applications (i.e., applications where there is a geofence relative to an object of interest, such as a mobile device, a car, a person, etc.). Various such examples are considered in accordance with aspects of the present disclosure. For example, car keys may employ RTT estimation for PKES systems. RTT-based geofences around an adult may monitor the position of a child within the geofence. Additionally, drone-to-drone and car-to-car RTT functionality may help prevent collisions.

However, various obstacles to RTT-based functionality may exist. For example, a rogue peer may impersonate a legitimate one, which may result in RTT "deflation" (or "inflation") (i.e., such that a receiver may measure a range different from the actual range). Techniques for securing RTT estimation against such attacks (e.g., against physical layer attacks on range measurements) may be desired. Although aspects of the present disclosure may be described with reference to IEEE 802.11 REV-mc Wi-Fi RTT and IEEE 802.11az planned and proposed ranging solutions as illustrations, the techniques disclosed herein may be applicable to protecting RTT measurements using any suitable radio access technology (RAT) and any present or future releases thereof.

Various proposals (e.g., which may be used alone or in any combination) are described to address physical level attacks of RTT-based ranging messages. For example, WLAN 100 may support various techniques described herein that inhibit an attacker (e.g., a rogue peer wireless device) from interfering with RTT-based ranging measurements (e.g., by replacing part of a ranging packet so as to generate a false range). Generally, the techniques described herein may deny an attacker knowledge of how to transmit an overlaid ranging sounding training signal (e.g., which may affect the attacked modem's range calculations). Furthermore, the techniques described herein may be extended to additional techniques that provide protection of physical level attacks (e.g., by combining various aspects of the different methods or adjusting various aspects of the respective methods). A first method may include encoding the base LTF sequence used for the ranging sounding signal (e.g., by applying code phase rotations). For example, a set of phase rotations may be applied to the base LTF sequence, where a different phase rotation may be applied to each tone in the base LTF sequence. Additionally, the phase rotations may vary between different transmissions of the LTF sequence. In some cases, the encoding of the LTF may be conveyed to a receiver in a different field, such as a packet extension field. A second method may include cyclically delaying the orthogonal frequency division multiplexing (OFDM) symbols making up the ranging sounding training signals (e.g., where the cyclic delay is unknown to the attacker). Another method may include transmitting the ranging sounding training sequence with varying time delay (e.g., which may be unknown to the attacker).

Figure 2:
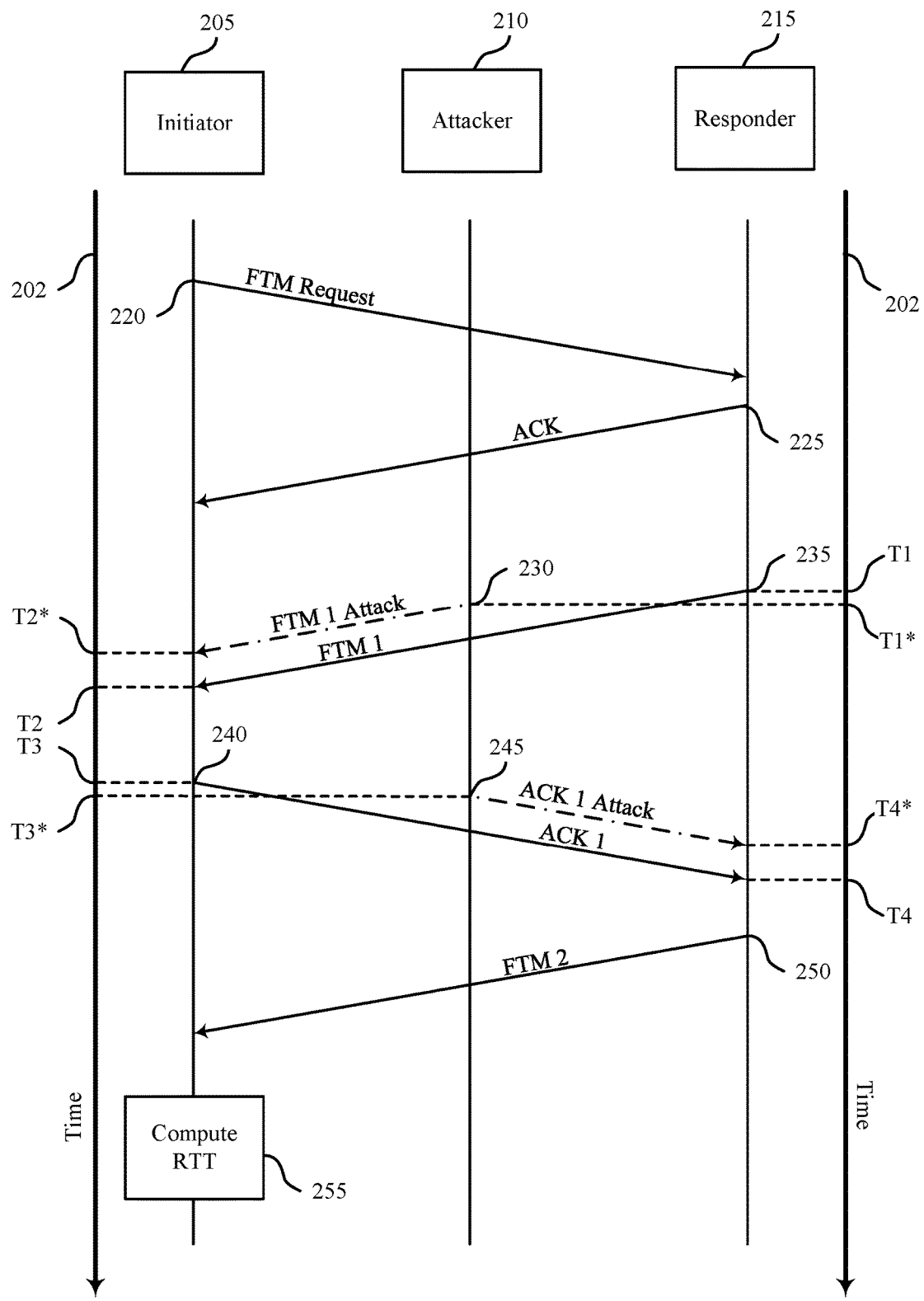
FIGS. 2 and 3 illustrate examples of process flows in a system that supports protection of ranging sounding signals from physical level attacks in accordance with aspects of the present disclosure.

FIG. 2 illustrates a process flow 200 in a system that supports protection of ranging sounding signals from physical level attacks in accordance with aspects of the present disclosure. For example, aspects of process flow 200 may illustrate the Wi-Fi 802.11 REV-mc RTT measurement protocol introduced above. Process flow 200 illustrates multiple wireless devices including an initiator 205 and responder 215, as well as attacker 210, and each device may be an example of an AP 105 or STA 115 (or some combination thereof), as described above with reference to FIG. 1. In aspects, the RTT measurement protocol may be based on the sequential exchange of fine timing measurement (FTM) signals between two communicating devices. For the sake of simplicity, time axis 202 has been duplicated and illustrated on each side of process flow 200.

Briefly, the FTM-based RTT protocol may involve initiator 205 sending an FTM request at 220, to which responder 215 transmits an acknowledgement (ACK) at 225. In some examples, these transmissions may be used to establish who is the initiator 205 and/or to ensure that both initiator 205 and responder 215 commit to remaining awake during the transmission of subsequent message exchanges. At 235, responder 215 may transmit a signal (e.g., referred to as FTM 1) at time T1. FTM 1 may be received by initiator 205 at time T2 (e.g., which may be timestamped with T2). At 240, initiator 205 may respond with ACK 1 (e.g., at time T3), which may be received by responder 215 at time T4. Subsequently (e.g., at 250), responder 215 may send FTM 2, which may contain information about T1 and T4. Using the information included in FTM 2, initiator 205 may compute RTT at 255. For example, the RTT may be computed as $((T2-T1)+(T4-T3))/2$. In various examples, the time stamp pairs (T1, T4) and (T2, T3) may be in reference to local clocks of the initiator 205 and responder 215, respectively. In some cases, multiple FTM signals may be exchanged and the RTT may be computed based on some combination of RTTs for the multiple FTM signals.

In some cases, however, attacker 210 may interfere with this RTT measurement protocol. For example, attacker 210 may attempt to trick initiator 205 into determining that responder 215 is closer than responder 215 really is. In aspects, such an attack may be referred to as a Wi-Fi RTT deflation attack (e.g., because the attacker is 'deflating' the RTT computed at 255). Generally, such RTT deflation may be achieved by decreasing T2 or T4 or increasing T1 or T3, or some combination of these. In some examples, attacker 210 may impersonate one or both of initiator 205 and responder 215 (e.g., by producing its own FTM and/or ACK frame). Additionally or alternatively, attacker 210 may overlay a measurement part of the FTM and/or ACK frames with a time-advanced training sequence. Although aspects of the examples herein are described in terms of RTT deflation, RTT inflation (e.g., in which an attacker inflates the RTT computed at 255) is also considered, among other examples.

For example, at 230, attacker 210 may transmit FTM 1 Attack, which may in some cases overlay the measurement part of the FTM 1 transmitted from responder 215 at 235. Initiator 205 may compute a smaller T2 value (i.e., T2*). Additionally or alternatively, attacker 210 may attack the ACK 1 transmitted by initiator 205 at 240 (i.e., with ACK 1 Attack by attacker 210 at 245), which may cause responder 215 to compute a smaller T4 value (i.e., T4*). Other possible attack scenarios are considered, and these examples provided are illustrated for explanation only. In some cases, attacker 210 may perform its attacks under certain time constraints (e.g., so as to ensure that a reasonable RTT is computed at 255 and the measurement is not discarded).

Figure 3:
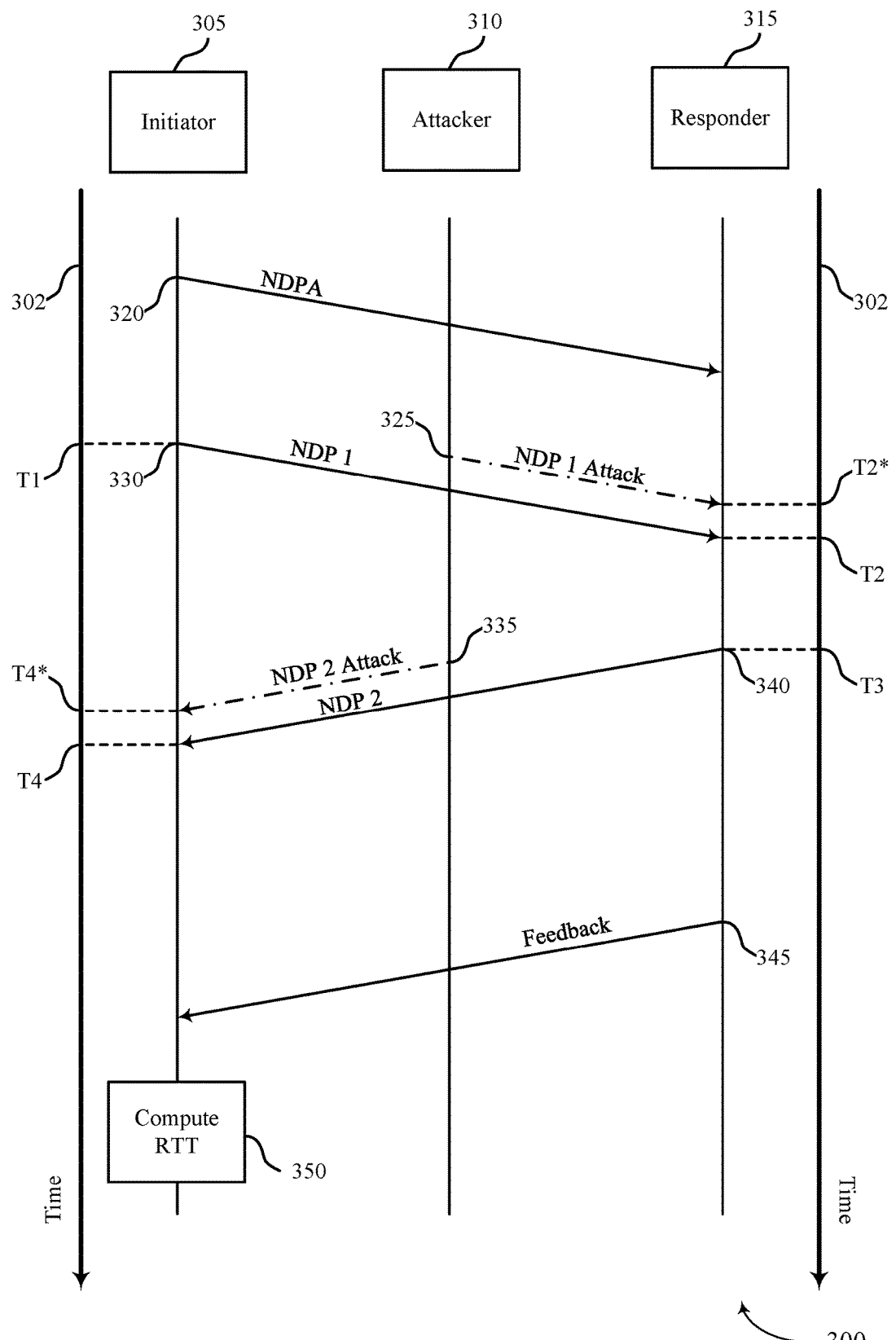

FIG. 3 illustrates a process flow 300 in a system that supports protection of ranging sounding signals from physical level attacks in accordance with aspects of the present disclosure. For example, aspects of process flow 300 may illustrate the IEEE 802.11az ranging protocol introduced above. That is, the 802.11az ranging protocol (e.g., which may be single user (SU) or multi-user (MU) MIMO transmissions) may be based on null data packet (NDP) transmissions, which may be vulnerable to physical layer attacks. For example, a proposed uplink MU-MIMO ranging sequence for 802.11az may rely on staggered sounding transmissions from the multiple users and/or symbol-interleaved sounding transmissions. In each case, the sounding transmissions may be subject to precise timing control (e.g., through the use of a trigger frame). An attacker that interrupts this timing control (e.g., at the physical layer) may negatively affect the ranging protocol. Similar negative effects on the SU protocol are also considered (e.g., as illustrated with reference to process flow 300). Initiator 305 and responder 315, as well as attacker 310, may each be an example of an AP 105 or STA 115, as described above with reference to FIG. 1. For the sake of simplicity, time axis 302 has been duplicated and illustrated on each side of process flow 300.

Briefly, the 802.11az SU RTT-based ranging protocol may involve initiator 305 transmitting a null data packet announcement (NDPA) at 320. The NDPA may initiate the sounding process by gaining control of the channel (e.g., by using any suitable clear channel assessment), including indicating a duration of the channel sounding sequence and identifying the intended responder 315 (e.g., or multiple responders 315 in the MU case). Subsequently, at 330, initiator 305 may transmit NDP 1 (e.g., at time T1). In aspects, and as described further with reference to FIG. 4, NDP 1 may allow responder 315 to analyze the training fields to calculate a channel response upon reception at time T2. At time T3, responder 315 may transmit an NDP 2 (i.e., at 340), which may be received by initiator 305 at time T4. For example, NDP 1 and NDP 2 may be used to measure the channel response based on the direction of transmission (e.g., from initiator 305 to responder 315 or from responder 315 to initiator 305). At 345, responder 345 may transmit feedback (e.g., channel state information) to initiator 305, which may enable initiator 305 to compute RTT at 350. A similar computation may in some cases be performed at responder 315.

In some cases, however, attacker 310 may interfere with this RTT measurement protocol. For example, attacker 310 may attempt to trick initiator 305 into determining that responder 315 is closer than responder 315 really is. In aspects, such an attack may be referred to as a deflation attack (e.g., because the attacker is 'deflating' the RTT computed at 350). Generally, such RTT deflation may be achieved by decreasing T2 or T4 and/or increasing T1 or T3. In some examples, attacker 310 may impersonate initiator 305 (e.g., where attacker 310 produces its own NDP frame). Additionally or alternatively, attacker 310 may overlay the measurement part of the NDP frames with a time-advanced training sequence. Although aspects of the examples herein are described in terms of RTT deflation, RTT inflation (e.g., in which an attacker inflates the RTT computed at 350) is also considered.

For example, at 325, attacker 310 may transmit NDP 1 Attack, which may in some cases overlay the measurement part of the NDP 1 transmitted from initiator 305 at 330. Responder 315 may compute a smaller T2 value (i.e., T2*). Additionally or alternatively, attacker 310 may attack the NDP 2 transmitted at 340 (i.e., with NDP 2 Attack at 335), which may cause the initiator 305 to compute a smaller T4 value (i.e., T4*). Additional possible attacks are considered, and the described attacks are illustrated for explanation only. In some cases, attacker 310 may perform its attacks under certain time constraints (e.g., so as to ensure that a reasonable RTT is computed at 350 and the measurement is not discarded).

Figure 4:
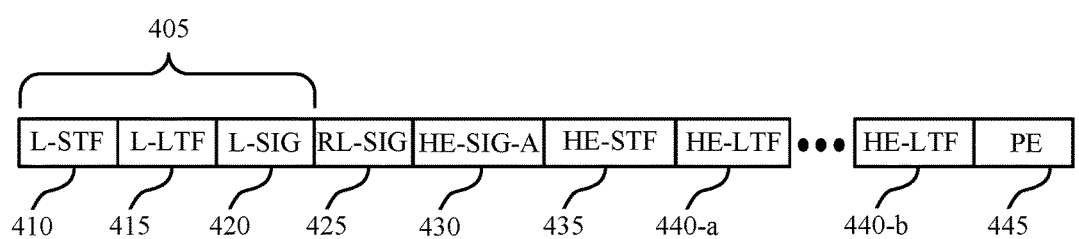
FIG. 4 illustrates an example of a null data packet that supports protection of ranging sounding signals from physical level attacks in accordance with aspects of the present disclosure.

FIG. 4 illustrates an example of a NDP 400 that supports physical level protection of ranging sounding signals from physical level attacks in accordance with aspects of the present disclosure. NDP 400 contains multiple fields. As illustrated, in some cases, NDP 400 may begin with a legacy preamble 405 (e.g., a coexistence header) including an L-STF 410, an L-LTF 415, and an L-SIG 420. Presence of these symbols may enable a new design to be compatible with legacy designs and products. In some cases, the NDP 400 may further include a repeated L-SIG (RL-SIG) 425. RL-SIG 425 may contain the same content as the L-SIG 420 (e.g., to provide robustness and/or to indicate that additional non-legacy fields may follow). L-STF 410 may be used for initial frequency offset estimation, time synchronization, and automatic gain control setting. L-LTF 415 may be used for channel estimation and for more accurate frequency offset estimation and time synchronization. Additionally or alternatively, L-LTF 415 may be used for demodulation operation of certain fields within NDP 400. L-SIG 420 (e.g., and RL-SIG 425) may contain coding rate and length information for the packet.

NDP 400 may also contain multiple fields following the legacy preamble 405 (e.g., which may in some cases include RL-SIG 425) to facilitate the sounding process described above. In the present example, these additional fields are described as being examples of HE fields, though they may additionally or alternatively be examples of very high throughput (VHT) fields, high throughput (HT) fields, etc. HE-SIG-A 430 may be an example of a HE header and contains symbols that carry MAC layer information. In some cases, HE-SIG-A 430 may be repeated one or more times within NDP 400. HE-STF 435 may have similar functionality to L-STF 410 except that HE-STF 435 may be intended for use in channel sounding (e.g., for ranging, beamforming, etc.). The one or more HE-LTFs 440 may function similarly to L-LTF 415. In some cases, HE-LTF 440 may be used to determine an impulse response for the channel. Additionally or alternatively, the HE-LTFs 440 may be used primarily for timing measurements.

In some examples the number of HE-LTFs 440 within NDP 400 may be up to eight, sixteen, thirty-two, etc., and each HE-LTF 440 may correspond to a responder or group of responders from which channel state information is requested. NDP 400 may optionally include a packet extension (PE) field 445 (e.g., to extend the NDP 400 as used by the physical layer for transmission). In accordance with various aspects of the present disclosure, PE field 445 may be modified to protect transmissions from attack. For instance, PE field 445 may convey phase rotation values to be used for performing timing measurements on another LTF. As an example, when PE field 445 field is located prior to HE-LTF 440 (or another type of LTF), PE field 445 may point to one of many pre-established codes stored in a wireless device (e.g., such that other devices have no knowledge of the stored codes) to mitigate against a physical level attack, such as a timing measurement attack. Alternatively, PE field 445 may be sent after HE-LTF 440 (or another type of LTF), which may, in some cases, involve further processing, but again mitigates against timing measurement attacks.

Physical layer protection of ranging sounding sequences may be achieved in whole or in part by encoding some or all of the sounding training signal. That is, using an LTF training sequence (e.g., HE-LTF 440) that is unknown to an attacker may protect the sounding training signal from physical layer attacks. In some examples, encoding of the sounding training signal may be achieved by applying a sequence of phase rotations to the LTF base sequence used in its construction. For example, a set of LTF phase encodings that result in acceptable peak-to-average-power-ratios (PAPRs) may be designed (e.g., and known to a transmitter and receiver). In some cases, the set of phase encodings may be applied to the training signal on a per-tone basis in the frequency domain. For example, phase encoding may vary in frequency for a given training signal as well as in time (e.g., across different training signals). In some examples, the phase rotation may be applied to tones in a frequency domain of a set of generated OFDM symbols. Additionally or alternatively, different phase rotations may be applied to respective OFDM symbols of the sounding training signal.

In some cases, the information regarding the LTF encoding may be conveyed in a position in the frame (e.g., NDP 400) following the HE-LTF 440. For example, the PE field 445 may be modified to convey an index pointing to one of the phase encodings in this set. In other examples, the phase encoding information may otherwise be conveyed, for example, in a subsequent packet. By conveying the encoding information after the LTF is transmitted/received, the protection scheme may be simplified in some cases. For example, the LTF encoding information itself may not be encrypted in some cases (i.e., because once the encoding information is intercepted by an attacker, the opportunity to interfere with the LTF may have already passed). However, in some other cases, the LTF encoding information may still be encrypted (e.g., in order to provide more robust protection).

Additionally or alternatively, the information regarding how the LTF is encoded may be conveyed to the receiver (e.g., in an encrypted form) prior to the reception of the sounding training signal (e.g., NDP 400, an FTM, or some other sounding training signal). In aspects, the encoding of the LTF sequence may not be reused in successive or periodic sounding transmissions (e.g., in order to ensure security).

In some examples, PE field 445 may be transmitted as part of the legacy preamble 405 (e.g., such that the PE field 445 may be demodulated using the channel estimation from the L-LTF 415). However, in various examples, the PE field 445 may still come at the end (i.e., a temporally last part) of NDP 400 (e.g., or otherwise be located after the HE-LTFs 440).

For example, physical layer channel estimation at a receiver may be processed as usual, except that the receiver may perform frequency domain smoothing. The resulting raw frequency domain channel estimate (e.g., impulse response) may then be stored (e.g., temporarily). Following decoding of the PE field 445, information about the LTF base sequence (e.g., HE-LTF 440) phase encoding may be obtained. Subsequently, the raw channel estimate may be compensated by applying the corresponding phase de-rotations (e.g., on a per-tone basis). The phase compensated channel estimate may then be used for the regular ranging sounding estimation.

Additionally or alternatively, protection of ranging sounding may be accomplished in whole or in part by cyclic delay shifting of the ranging sounding training sequence (e.g., HE-LTF 440). That is, encoding of the ranging sounding sequence may include employing cyclic delay shifting to the OFDM symbols in the ranging sounding training sequence. An attacker may not know what cyclic delay has been applied, and may not be able to interfere with the ranging sounding training signal in a meaningful way. The intended receiver may perform channel estimation as normal, including transforming the frequency domain channel estimate to the delay domain (e.g., using an inverse fast Fourier transform (IFFT)). When the cyclic delay applied to the ranging sounding training sequence is known by the receiver, the receiver can compensate by cyclically shifting the delay domain version of the channel estimate. For example, if the applied cyclic shift is known at the time of reception of the training signal, the compensation may be performed immediately upon reception. Alternatively, if the applied cyclic shift is only known at a later point in time, then the compensation may be performed later on a stored version of the delay domain version of the channel estimate.

In some examples, information regarding the cyclic shift applied to the ranging sounding training sequence may be conveyed prior to reception of the HE-LTF 440. In such a scenario, the information about the applied cyclic shift may be encrypted. Additionally or alternatively, the information about the applied cyclic shift may be conveyed in a portion of the frame after the ranging sounding training sequence (e.g., in PE field 445). As described above, the PE field 445 may be transmitted as part of the legacy preamble 405 (e.g., using the same encoding and relevant formatting) such that the PE field 445 may be demodulated using the channel estimate from the L-LTF 415.

Various considerations may be satisfied by encoding the ranging sounding training signal with cyclic delay shifting. For example, the designed low peak-to-average power ratio (PAPR) of the HE-LTF 440 symbols may be preserved. Additionally or alternatively, the decoding of the training signal may be achieved using a simple operation in the delay domain version of the channel estimate. The applied cyclic shift delay may be conveyed in the PE field 445, and compensation for the cyclic shift delay may be performed on a stored version of the signal (e.g., using software). In some examples, hardware changes to support aspects of the present disclosure may be minimized or eliminated.

The techniques described above contain multiple important distinguishing factors. For example, conveying the applied encoding in a field after the ranging sounding training sequence (e.g., in an unencrypted format) may provide a relatively simple form of protection from physical layer attacks. Additionally or alternatively, modulating the field carrying the encoding information (e.g., PE field 445) as a legacy transmission may enable demodulation of the packet extension without the use of the encoded ranging sounding training sequence.

The techniques described above may be used in various ways to provide robust protection of sounding training signal transmissions. For instance, in the examples illustrating aspects of sounding training signals with a cyclic shift applied, additional security may be achieved through multiple range measurements between a transmitter and a receiver using the cyclically-shifted sounding training signals. As an example, more than one range measurement may be implemented in a ranging sounding procedure, where successive range measurements may be used to provide a meaningful range measurement (e.g., statistically). In such cases, a would-be attacker may be prevented from continuously estimating the cyclic delay shift applied to the sounding training signal, and in turn, may be unable to interfere with the sounding ranging estimation between the transmitter and receiver over time (e.g., as the attacker may be unable to successfully 'guess' or predict each successive cyclic shift used). Through a selection of a number of such range measurements, the procedure may efficiently provide for a range of security for sounding training signal transmission.

Figure 5A:
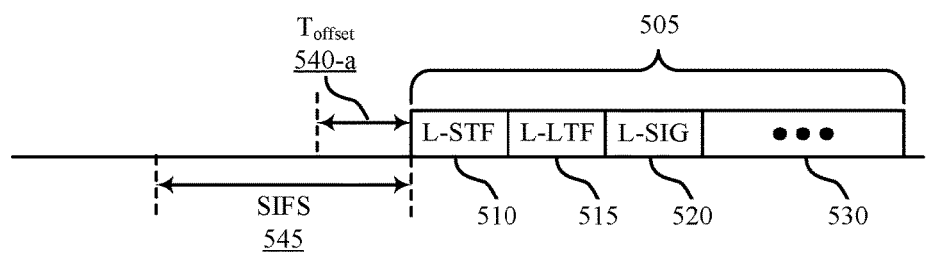
FIGS. 5A and 5B illustrate examples of sounding training signal transmissions that support protection of ranging sounding signals from physical level attacks in accordance with aspects of the present disclosure.
Figure 5B:
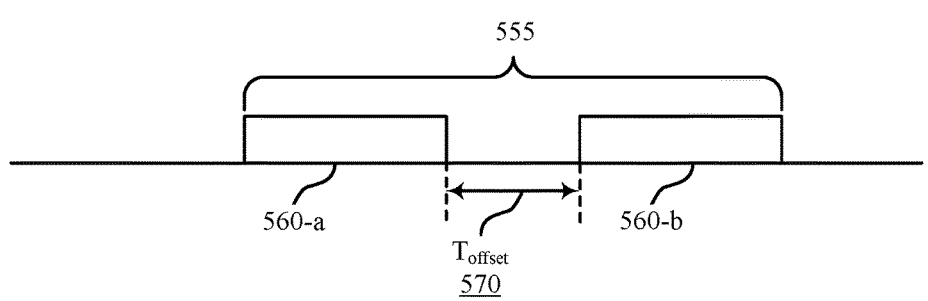

FIGS. 5A and 5B illustrate examples of sounding training signal transmissions 501 and 502 that support protection of ranging sounding signals from physical level attacks in accordance with aspects of the present disclosure. In some cases, protection of sounding training signals may include the use of time shifting of the training signals. For example, sounding training signal transmission 501 may illustrate the transmission of a time-shifted sounding training signal through the addition of a time offset to an interframe spacing, whereas sounding training signal transmission 502 may illustrate the transmission of a time shifted sounding training signal through splitting a frame.

As illustrated in FIG. 5A, the sounding training signal transmission 501 may include a frame 505 used for a sounding ranging estimation between a transmitter and a receiver, where frame 505 may include a number of fields, including, for example, L-STF 510, L-LTF 515, L-SIG 520, and additional fields 530 which may include any number of other header fields, payload, or other information sent from a transmitter to a receiver.

In some cases, an attack (e.g., an overlay attack, as described above) may rely on the ability of an attacker (e.g., a rogue peer wireless device) to obtain a time reference for the packet as it is being transmitted. For example, such a time reference may be obtained by detecting an STF (e.g., L-STF 510). The attacker may then overlay a time-advanced version of the training sequence (e.g., the L-LTF 515 and/or an HE-LTF included in additional fields 530) on the original training signal. In some cases, the attacker may need to know the time-of-flights between the transmitter and intended receiver, which may not be an insurmountable problem for the attacker.

In some cases, protection may be achieved in whole or in part by denying the attacker a time-reference as to when it may transmit its overlay to the training signal. For example, such protection may be achieved by removing all fields prior to the time-reference training sequence (i.e., prior to L-LTF 515). That is, protection may be achieved by removal of all fields prior to the ranging training sounding sequence (e.g., removal of all fields prior to a sounding training signal in an NDP, removal of all fields prior to a VHT-LTF (which may be included in additional fields 530) for an ACK sent using VHT format, etc.). Additionally or alternatively, timing information may be omitted or removed from one or more frames (e.g., such as L-LTF 515, or any other frames that include timing information of sounding training signal transmission 501), where the timing information may be replaced with no information (e.g., be left as null symbols or left blank) or may be replaced with junk symbols (e.g., a set of arbitrary symbols that do not convey any information). In aspects, the timing of the protected packet may be strictly controlled by a time-offset parameter (e.g., Toffset 540-*a*), which may be added to a short interframe spacing (SIFS) 545 that would otherwise apply to transmissions of frame 505. In some cases, an encrypted indication of Toffset 540-*a* may be conveyed from the transmitter to the receiver. In some cases, Toffset 540-*a* may vary with different transmissions of frame 505.

Protection for sounding training signals may be achieved by delaying the ranging sounding training sequence and deny an attacker of a time-reference with which to transmit its attacking training signal. In some cases, removal of the L-STF 510, or removal of all fields prior to a sounding training signal, may be compensated for by application of open loop power control. That is, a transmitter may measure the power level at which it receives a prior transmission from the intended receiver and adjust the transmit power of the sounding training signal accordingly. In some cases, this prior transmission may contain information regarding the power at which it was transmitted (e.g., an indication of the transmission power of the prior transmission).

Some aspects of the examples in FIG. 5A above have been described with reference to the 802.11az REV-mc proposed and planned ranging sounding exchanges, though they may additionally or alternatively be extended to cover protection of FTM signaling. Other RTT-based sounding procedures are also considered. For example, FIG. 5B may illustrate physical layer protection of FTM frames achieved through time shifting. Sounding training signal transmission 502 may include an FTM frame 555, and to apply time-shifting of the training sequence of FTM frame 555, a time reference may be introduced. In some examples, the time reference may be realized by turning the FTM frame into two packets (e.g., first packet 560-*a* and second packet 560-*b*). For example, first packet 560-*a* may be the regularly formatted FTM frame, and second packet 560-*b* may be an additional frame that contains an LTF-style training signal. Second packet 560-*b* may be transmitted with the same power level as the first packet, but with a time-offset delay (e.g., Toffset 570). Similar modifications for an ACK transmission (e.g., splitting an ACK transmission into multiple packets 560 to provide protection) are also considered. An extra frame may be added after a regular frame (e.g., the FTM packet) containing only a ranging sounding training sequence.

As with the enhanced security provided through the encoding technique described above, the time-delay applied to the sounding training signal may provide for similar security enhancements for sounding ranging estimation. That is, multiple range measurements between a transmitter and a receiver using the time-delayed sounding training signals may enable a configurable level of security. As an illustrative example, to prevent an attacker from performing a number of estimates or guesses as to the time delay used for the sounding training signal, more than one range measurement may be implemented before, for example, a car door is unlocked. The aspiring attacker may be unable to successfully guess the applied time-shift correctly in some or all of a series of range measurements (e.g., within a statistical range), a close proximity may not be successfully generated for the attacker, and the car door may remain locked. As mentioned above, any number of range measurements may be used to provide various degrees of security for sounding ranging procedures.

Figure 6:
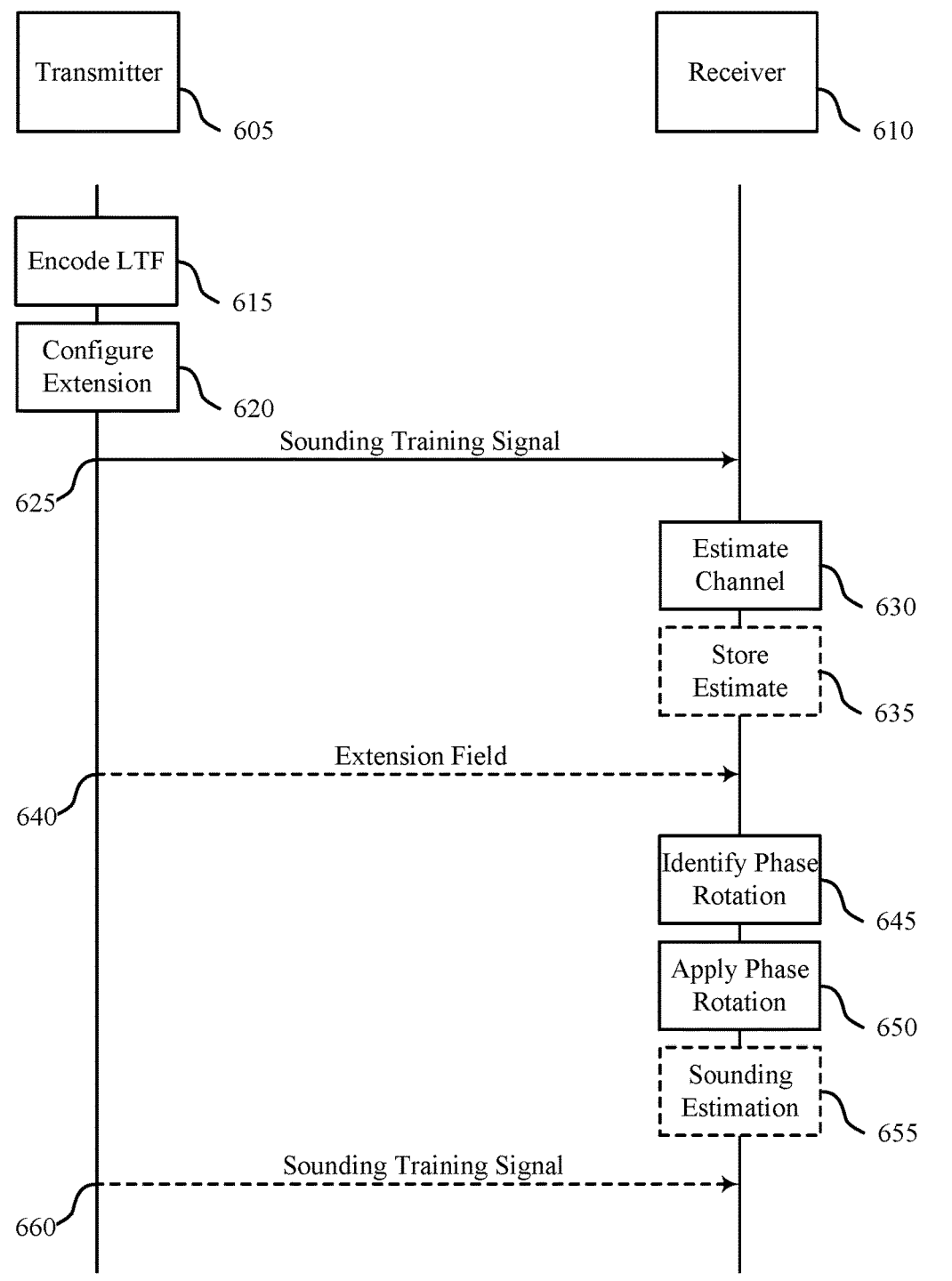
FIGS. 6 through 8 illustrate examples of process flows in a system that supports protection of ranging sounding signals from physical level attacks in accordance with aspects of the present disclosure.

FIG. 6 illustrates an example of a process flow 600 in a system that supports protection of ranging sounding signals from physical level attacks in accordance with aspects of the present disclosure. Process flow 600 includes a transmitter 605 and receiver 610, each of which may be an example of an AP 105 or a STA 115 as described with reference to FIG. 1. Process flow 600 may illustrate encoding of a sounding training signals with a series of phase rotations for the protection of sounding ranging procedures between transmitter 605 and receiver 610.

At 615, transmitter 605 may encode an LTF portion of a sounding training signal by applying a phase rotation to the LTF. In some cases, the LTF is encoded using a set of phase rotations applied to an LTF base sequence. The set of phase rotations may be applied to the LTF on a per-tone basis (e.g., such that each transmitted tone is encoded using a different phase rotation of the set of phase rotations). In some cases, multiple tones may share a phase rotation.

At 620, transmitter 605 may configure an extension field of the sounding training signal to include an indication of the encoding performed at 615. In some examples, the extension field may be referred to as a PE field. In some cases, the extension field includes a PE field modulated according to a legacy portion of a frame (e.g., a legacy portion of the sounding training signal).

At 625, transmitter 605 may transmit (e.g., and receiver 610 may receive) the sounding training signal including the encoded LTF. In some cases, the sounding training signal may additionally include the extension field configured at 620. Additionally or alternatively, the extension field may be transmitted (and received) separately (e.g., at 640). In aspects (e.g., if the extension field and encoded LTF are transmitted together in the sounding training signal), the extension field may be transmitted after the encoded LTF. In some cases, the sounding training signal may be included in a NDP frame.

At 630, receiver 610 may determine a channel estimate using a channel estimation procedure based on the sounding training signal received at 625. In some cases, channel estimation may additionally or alternatively be performed after reception of the extension field (e.g., which may be transmitted and received separately at 640).

At 635, receiver 610 may optionally store the determined channel estimate (e.g., before receiving the extension field at 640). At 640, receiver 610 may optionally receive the extension field of the sounding training signal (e.g., in the case that the extension field was not included in the sounding training signal at 625).

At 645, receiver 610 may identify a phase rotation of the LTF based on demodulating the received extension field (e.g., which may be received at 640 and/or 625). In some examples, demodulating the packet extension field is based at least in part on a legacy LTF of the legacy portion of the frame (e.g., the NDP frame). In some examples, the identified phase rotation includes a set of phase rotations applied on a per-tone basis.

At 650, receiver 610 may apply the phase rotation identified at 645 to the channel estimate determined at 630 (e.g., and optionally stored at 635) to obtain a phase-compensated channel estimate. At 655, receiver 610 may optionally perform a ranging sounding estimation based at least in part on an impulse response determined using the phase-compensated channel estimate.

At 660, transmitter 605 may optionally transmit (e.g., and receiver 610 may optionally receive) a second LTF of a second sounding training signal. In some cases, the second LTF may be encoded using a second phase rotation (e.g., or set of phase rotations applied on a per-tone basis), where the second phase rotation is different from the phase rotation applied at 615.

Figure 7:
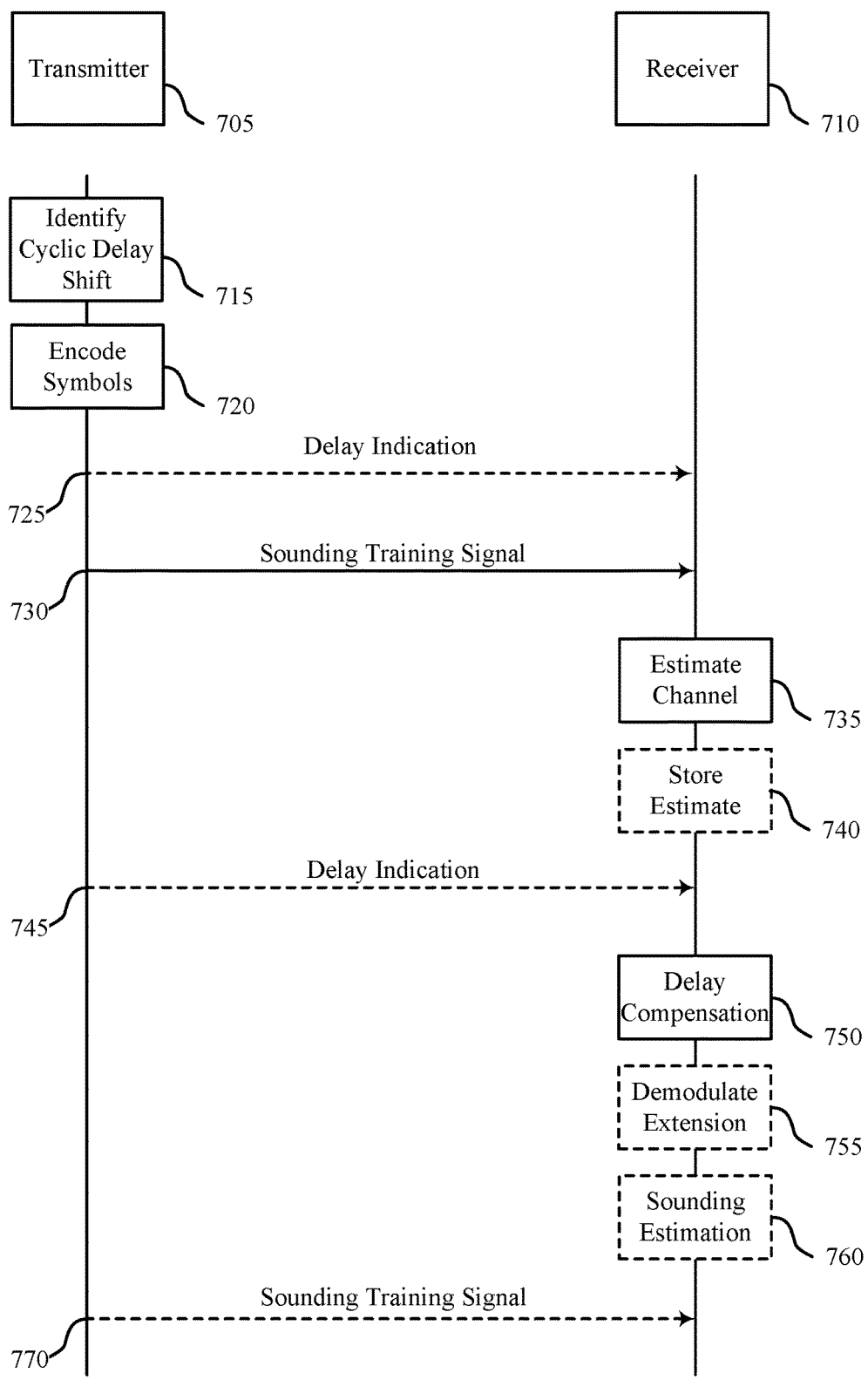

FIG. 7 illustrates an example of a process flow 700 in a system that supports protection of ranging sounding signals from physical level attacks in accordance with aspects of the present disclosure. Process flow 700 includes a transmitter 705 and receiver 710, each of which may be an example of an AP 105 or a STA 115 as described with reference to FIG. 1 or the corresponding devices as described with reference to FIG. 6. Process flow 700 may illustrate encoding of a sounding training signal with a cyclic delay shift applied to different OFDM symbols of the sounding training signal for the protection of sounding ranging procedures between transmitter 705 and receiver 710.

At 715, transmitter 705 may identify a first cyclic delay shift for a first sounding training signal used for a ranging sounding estimation. At 720, transmitter 705 may encode modulation symbols (e.g., OFDM symbols) of the first sounding training signal, where the modulation symbols are each encoded with the cyclic delay shift identified at 715.

At 725, transmitter 705 may optionally transmit (e.g., and receiver 710 may optionally receive) an indication of the first cyclic delay shift. In some cases, the indication at 725 may be encrypted or otherwise protected. As illustrated, the indication of the first cyclic delay shift at 725 may be received before an LTF of the sounding training signal (e.g., in a separate transmission).

At 730, transmitter 705 may transmit (e.g., and receiver 710 may receive) the sounding training signal. At 735, receiver 710 may determine a channel estimate from the received sounding training signal. In some cases, the channel estimate may have a delay representative of the cyclic delay shift.

At 740, receiver 710 may optionally store the determined channel estimate. In some cases, the stored channel estimate includes a time-domain version of the channel estimate determined at 735. In some cases, receiver 710 may store the determine channel estimate in the event that an indication of the first cyclic delay shift is not transmitted at 725.

At 745, receiver 710 may optionally receive an indication of the cyclic delay shift after receiving an LTF of the sounding training signal at 730. In some cases, the indication at 745 may be transmitted instead of the indication at 725. In some cases, the indication at 745 may be included within an extension field (e.g., a PE field) of the sounding training signal modulated according to a legacy portion of a frame (i.e., such that the indication at 745 may not constitute a separate transmission from the sounding training signal at 730).

At 750, receiver 710 may compensate for the delay of the channel estimate using the cyclic delay shift of the sounding training signal (e.g., which may be indicated at 725 or 745). At 755, receiver 710 may optionally demodulate the packet extension (e.g., received at 730 and/or 745) based at least in part on a legacy LTF of the legacy portion of the frame. At 760, receiver 710 may optionally perform a ranging sounding estimation based at least in part on an impulse response associated with the delay-compensated channel estimate. At 765, transmitter 705 may optionally transmit a second sounding training signal including modulation symbols that are each encoded with a cyclic delay shift that is different from the cyclic delay shift applied at 720.

Figure 8:
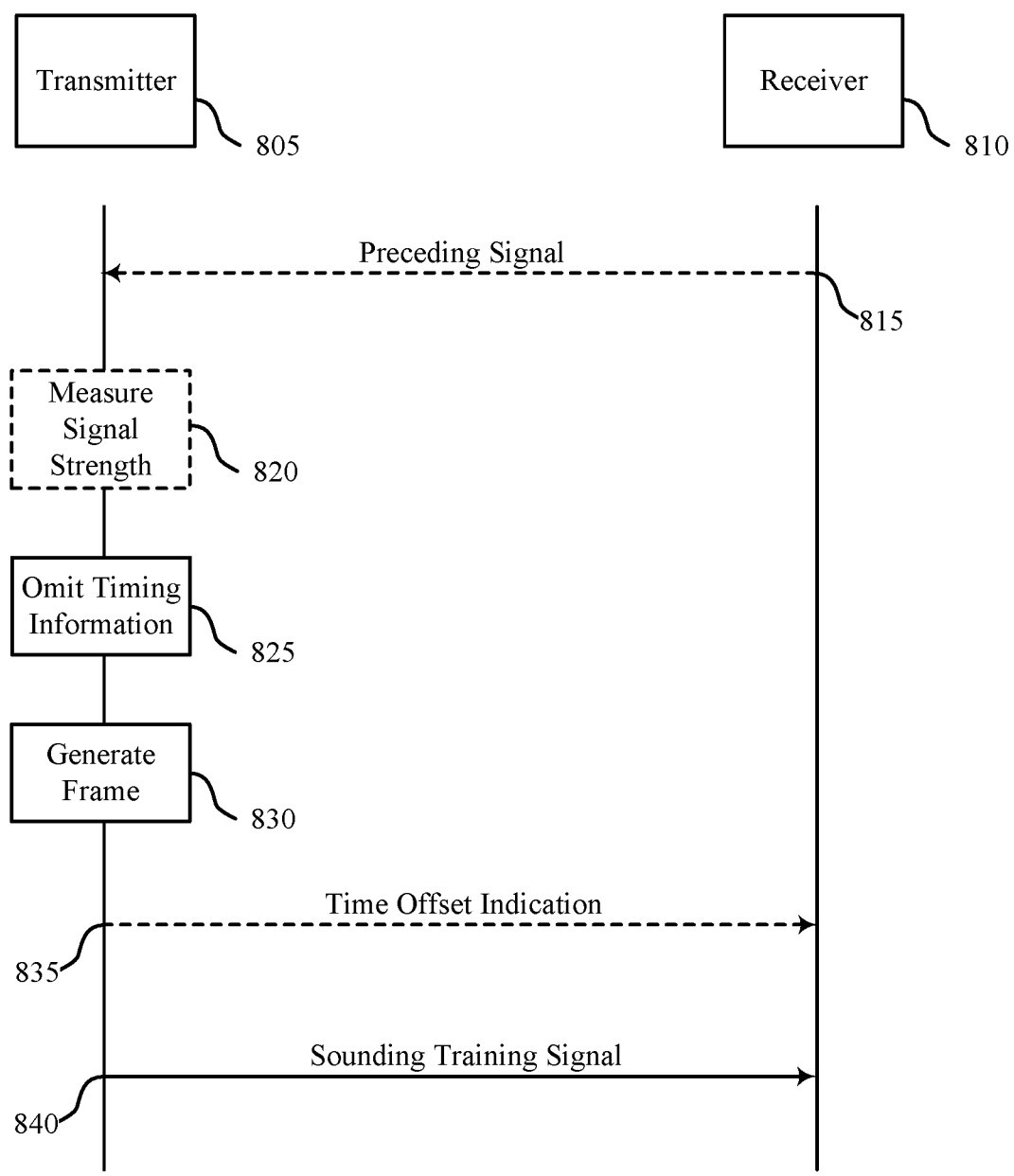

FIG. 8 illustrates an example of a process flow 800 in a system that supports protection of ranging sounding signals from physical level attacks in accordance with aspects of the present disclosure. Process flow 800 includes a transmitter 805 and receiver 810, each of which may be an example of an AP 105 or a STA 115 as described with reference to FIG. 1 or the corresponding devices as described with reference to FIGS. 6 and 7. Process flow 800 may illustrate the implementation of a time offset of sounding training signals for the protection of sounding ranging procedures between transmitter 805 and receiver 810.

At 815, transmitter 805 may optionally receive a preceding frame (e.g., a frame transmitted by receiver 810). In some cases, the preceding frame may include transmission power information used when transmitting the preceding frame. At 820, transmitter 805 may optionally measure a signal strength of the preceding frame received at 815. At 825, transmitter 805 may omit timing information for at least a portion of one or more fields located before an LTF of a frame. In some cases, omitting the timing information includes omitting the timing information from an STF of the frame and replacing the timing information with a set of arbitrary (or null) symbols. In some cases, the frame includes a FTM frame or a NDP frame. In some examples, omitting the timing information may include removing all of the one or more fields located before the LTF. The timing information omitted from the one or more fields of the frame may, for example, include a synchronization portion of a preamble, and transmitter 805 may determine to perform the measurement based on the omission (or removal) of the synchronization information. In such cases, open-loop power control may be used to ensure a transmitted sounding training signal arrives at receiver 810 with sufficient power.

In some examples, the transmission and reception of the sounding training signal may be controlled by a time-offset of the sounding training signal, and may be associated with a prior transmission of a trigger frame from transmitter 805. At 830, transmitter 805 may generate a frame for a ranging sounding estimation, the frame including a sounding training signal that is time shifted to occur after a measurement part of the frame. The generating may be based on a time offset that is applied to one or more fields of the frame. In such cases, a carrier frequency of the frame including the time-shifted sounding training signal may be synchronized to a carrier frequency of the preceding frame (i.e., the trigger frame).

In some examples, omitting the timing information includes splitting the frame into a first frame and a second frame, where the second frame includes a training signal corresponding to the time-shifted sounding training signal. In some cases, the second frame is offset from the first frame by a time offset delay. At 830, transmitter 805 may optionally generate a first frame and a second frame. In some cases, generating the frame may include appending a time offset to a SIFS before the frame.

At 835, transmitter 805 may optionally transmit an encrypted indication of the time offset. At 840, transmitter 805 may transmit the generated frame including the sounding training signal. In some cases, transmitting a time-shifted sounding training signal may include transmitting the first and second frame generated at 830. In some cases, transmitter 805 may optionally apply a power adjustment to the frame including the time-shifted sounding training signal based at least in part on the signal strength measured at 820.

Figure 9:
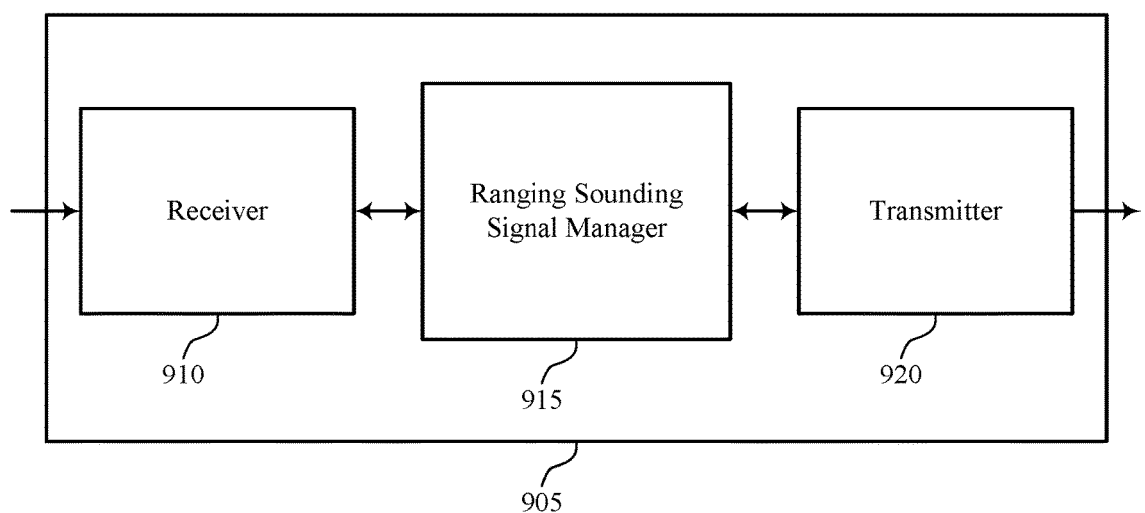
FIGS. 9 and 10 show block diagrams of a wireless device that supports protection of ranging sounding signals from physical level attacks in accordance with aspects of the present disclosure.

FIG. 9 shows a block diagram 900 of a wireless device 905 that supports protection of ranging sounding signals from physical level attacks in accordance with aspects of the present disclosure. Wireless device 905 may be an example of aspects of a receiving wireless device, such as a receiver 610, receiver 710, or receiver 810 as described with reference to FIG. 6, 7, or 8, respectively. Wireless device 905 may include receiver 910, ranging sounding signal manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to protection of ranging sounding signals from physical level attacks, etc.). Information may be passed on to other components of the device. The receiver 910 may be an example of aspects of the transceiver 1535 described with reference to FIG. 15. The receiver 910 may utilize a single antenna or a set of antennas.

Ranging sounding signal manager 915 may be an example of aspects of the ranging sounding signal manager 1215 described with reference to FIG. 12 or the ranging sounding signal manager 1515 described with reference to FIG. 15. Ranging sounding signal manager 915 and/or at least some of its various sub-components may be implemented in hardware, software executed by a processor, firmware, or any combination thereof. If implemented in software executed by a processor, the functions of the ranging sounding signal manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The ranging sounding signal manager 915 and/or at least some of its various sub-components may be physically located at different locations, including being distributed such that portions of functions are implemented at different physical locations by one or more physical devices. In some examples, ranging sounding signal manager 915 and/or at least some of its various sub-components may be a separate and distinct component in accordance with various aspects of the present disclosure. In other examples, ranging sounding signal manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Ranging sounding signal manager 915 may receive an LTF of a sounding training signal, determine a channel estimate using a channel estimation procedure based on the sounding training signal, receive an extension field of the sounding training signal, and identify a phase rotation of the LTF based on demodulating the received extension field. In such cases, identifying the phase rotation of the long training field may include demodulating the received extension field for or to identify an indication of the phase rotation. In some examples, ranging sounding signal manager 915 may apply the identified phase rotation to the channel estimate to obtain a phase-compensated channel estimate based on the sounding training signal. The ranging sounding signal manager 915 may also receive a sounding training signal including modulation symbols that are each encoded with a cyclic delay shift, determine a channel estimate from the received sounding training signal, the channel estimate having a delay representative of the cyclic delay shift, and compensate for the delay of the channel estimate using the cyclic delay shift of the sounding training signal.

Transmitter 920 may transmit signals generated by other components of the device. In some examples, the transmitter 920 may be collocated with a receiver 910 in a transceiver module. For example, the transmitter 920 may be an example of aspects of the transceiver 1535 described with reference to FIG. 15. The transmitter 920 may utilize a single antenna or a set of antennas.

Figure 10:
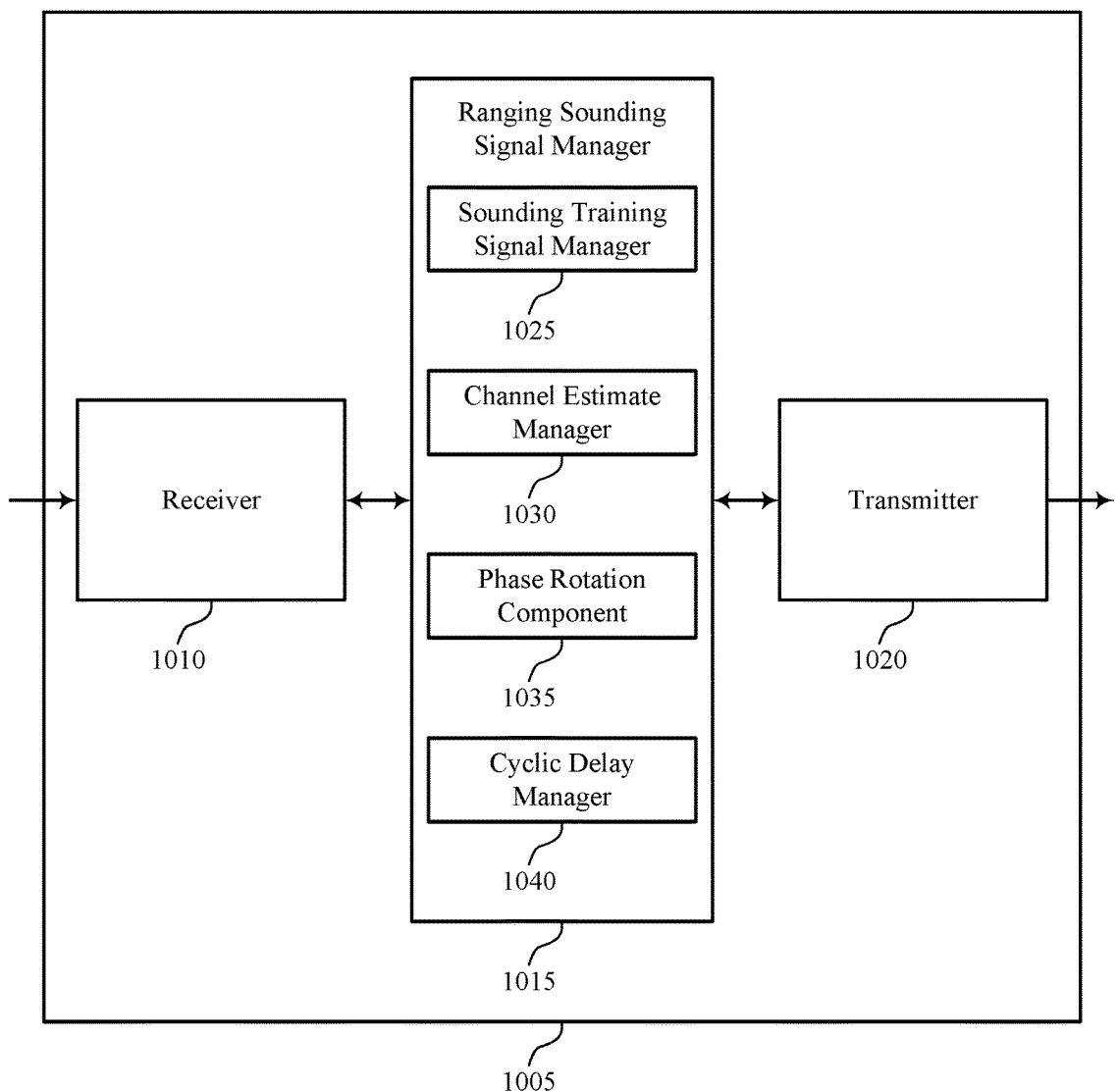

FIG. 10 shows a block diagram 1000 of a wireless device 1005 that supports protection of ranging sounding signals from physical level attacks in accordance with aspects of the present disclosure. Wireless device 1005 may be an example of aspects of a wireless device 905 as described with reference to FIG. 8 or a receiving wireless device such as a receiver 610, receiver 710, or receiver 810 as described with reference to FIG. 6, 7, or 8, respectively. Wireless device 1005 may include receiver 1010, ranging sounding signal manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to protection of ranging sounding signals from physical level attacks, etc.). Information may be passed on to other components of the device. The receiver 1010 may be an example of aspects of the transceiver 1535 described with reference to FIG. 15. The receiver 1010 may utilize a single antenna or a set of antennas.

Ranging sounding signal manager 1015 may be an example of aspects of the ranging sounding signal manager 1515 described with reference to FIG. 15. Ranging sounding signal manager 1015 may also include sounding training signal manager 1025, channel estimate manager 1030, phase rotation component 1035, and cyclic delay manager 1040.

Sounding training signal manager 1025 may receive an LTF of a sounding training signal, receive an extension field of the sounding training signal, and receive a second LTF of a second sounding training signal, the second LTF encoded using a second phase rotation from the sequence of phase rotations, where the second phase rotation is different from the phase rotation. In some cases, sounding training signal manager 1025 may receive a sounding training signal including modulation symbols that are each encoded with a cyclic delay shift. In some cases, the LTF is encoded using the phase rotation applied to an LTF base sequence, and where the phase rotation is from a sequence of phase rotations associated with different phase rotations of respective tones. In some cases, the extension field of the sounding training signal includes a packet extension field modulated according to a legacy portion of a frame. In some cases, the sounding training signal is included in a null data packet frame.

Channel estimate manager 1030 may determine a channel estimate using a channel estimation procedure based on the sounding training signal. In some examples, channel estimate manager 1030 may apply the identified phase rotation to the channel estimate to obtain a phase-compensated channel estimate based on the sounding training signal and store the determined channel estimate before receiving the extension field of the sounding training signal. Additionally or alternatively, channel estimate manager 1030 may determine a channel estimate from the received sounding training signal, the channel estimate having a delay representative of the cyclic delay shift, and store the determined channel estimate, where the stored channel estimate includes a time-domain version of the determined channel estimate. In some cases, channel estimate manager 1030 may compensate for the delay of the stored channel estimate using the identified cyclic delay shift.

Phase rotation component 1035 may identify a phase rotation of the LTF based on demodulating the received extension field. Cyclic delay manager 1040 may compensate for the delay of the channel estimate using the cyclic delay shift of the sounding training signal and receive an indication of the cyclic delay shift before receiving an LTF of the sounding training signal. In some examples, cyclic delay manager 1040 may receive an indication of the cyclic delay shift after receiving an LTF of the sounding training signal. In some cases, the indication of the cyclic delay shift received before the LTF of the sounding training signal is encrypted. In some cases, the indication of the cyclic delay shift is received in a packet extension field modulated according to a legacy portion of a frame.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1535 described with reference to FIG. 15. The transmitter 1020 may utilize a single antenna or a set of antennas.

Figure 11:
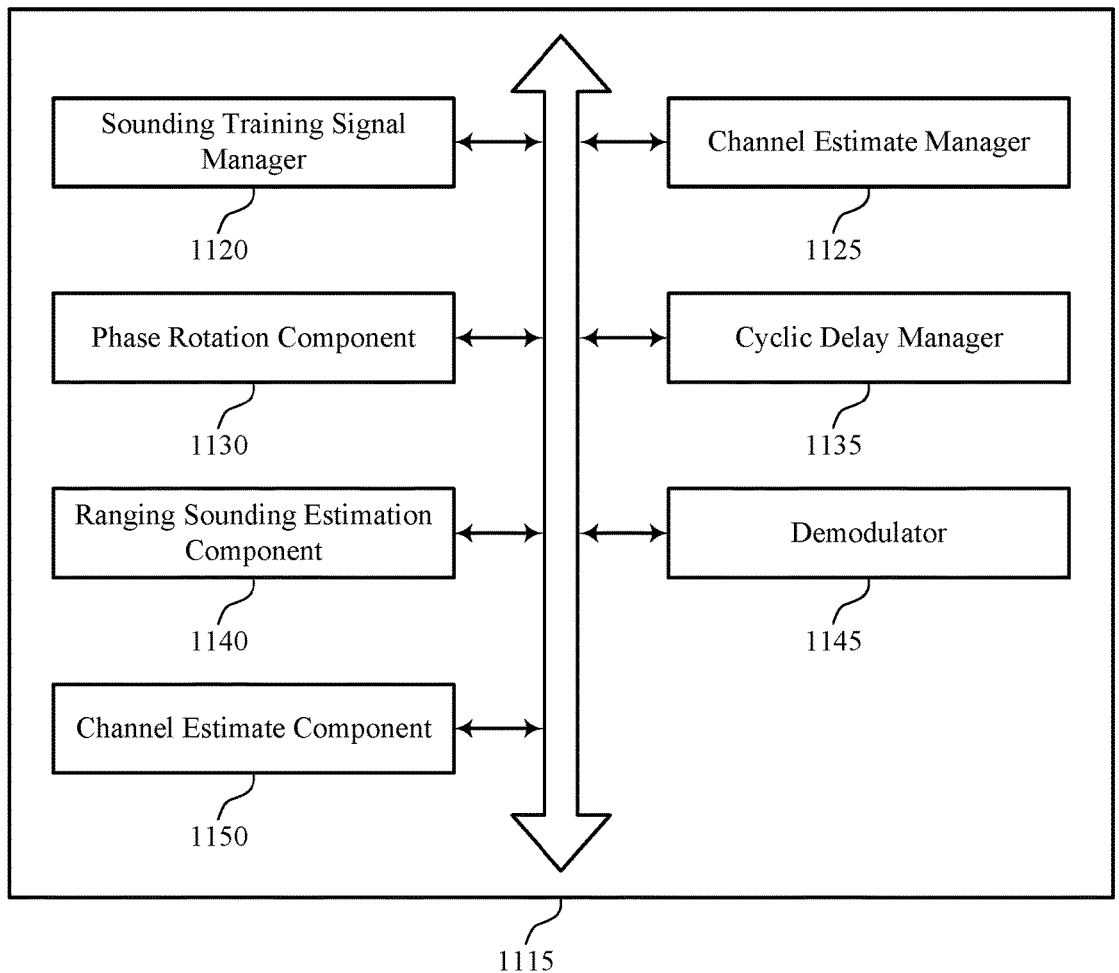
FIG. 11 shows a block diagrams of a ranging sounding signal manager that supports protection of ranging sounding signals from physical level attacks in accordance with aspects of the present disclosure.

FIG. 11 shows a block diagram 1100 of a ranging sounding signal manager 1115 that supports protection of ranging sounding signals from physical level attacks in accordance with aspects of the present disclosure. The ranging sounding signal manager 1115 may be an example of aspects of a ranging sounding signal manager 915, a ranging sounding signal manager 1015, or a ranging sounding signal manager 1515 described with reference to FIGS. 9, 10, and 15. The ranging sounding signal manager 1115 may include sounding training signal manager 1120, channel estimate manager 1125, phase rotation component 1130, cyclic delay manager 1135, ranging sounding estimation component 1140, demodulator 1145, and channel estimate component 1150. Each of these modules may communicate, directly or indirectly, with one another (e.g., via one or more buses).

Sounding training signal manager 1120 may receive an LTF of a sounding training signal, receive an extension field of the sounding training signal, receive a second LTF of a second sounding training signal, the second LTF encoded using a second phase rotation from the sequence of phase rotations, where the second phase rotation is different from the phase rotation, and receive a sounding training signal including modulation symbols that are each encoded with a cyclic delay shift. In some cases, the LTF is encoded using the phase rotation applied to an LTF base sequence, and where the phase rotation is from a sequence of phase rotations associated with different phase rotations of respective tones. In some cases, the extension field of the sounding training signal includes a packet extension field modulated according to a legacy portion of a frame. In some cases, the sounding training signal is included in a null data packet frame.

Channel estimate manager 1125 may determine a channel estimate using a channel estimation procedure based on the sounding training signal. In some examples, channel estimate manager 1125 may apply the identified phase rotation to the channel estimate to obtain a phase-compensated channel estimate based on the sounding training signal and store the determined channel estimate before receiving the extension field of the sounding training signal. Additionally or alternatively, channel estimate manager 1125 may determine a channel estimate from the received sounding training signal, the channel estimate having a delay representative of the cyclic delay shift, and store the determined channel estimate, where the stored channel estimate includes a time-domain version of the determined channel estimate. In some cases, channel estimate manager 1125 may compensate for the delay of the stored channel estimate using the identified cyclic delay shift.

Phase rotation component 1130 may identify a phase rotation of the LTF based on demodulating the received extension field. Cyclic delay manager 1135 may compensate for the delay of the channel estimate using the cyclic delay shift of the sounding training signal and receive an indication of the cyclic delay shift before receiving an LTF of the sounding training signal. In some examples, cyclic delay manager 1135 may receive an indication of the cyclic delay shift after receiving an LTF of the sounding training signal. In some cases, the indication of the cyclic delay shift received before the LTF of the sounding training signal is encrypted. In some cases, the indication of the cyclic delay shift is received in a packet extension field modulated according to a legacy portion of a frame.

Ranging sounding estimation component 1140 may perform a ranging sounding estimation based on an impulse response associated with the phase-compensated channel estimate and perform a ranging sounding estimation based on an impulse response associated with the delay-compensated channel estimate. Demodulator 1145 may demodulate the packet extension field based on a legacy LTF of the legacy portion of the frame and demodulate the packet extension based on a legacy LTF of the legacy portion of the frame. Channel estimate component 1150 may compensate for the delay of the channel estimate after determining the channel estimate.

Figure 12:
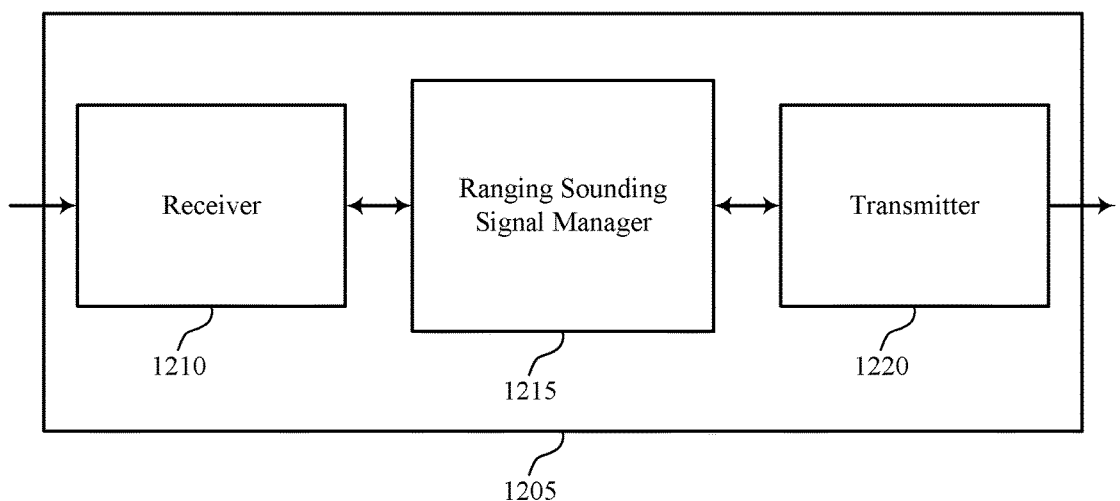
FIGS. 12 and 13 show block diagrams of a wireless device that supports protection of ranging sounding signals from physical level attacks in accordance with aspects of the present disclosure.

FIG. 12 shows a block diagram 1200 of a wireless device 1205 that supports protection of ranging sounding signals from physical level attacks in accordance with aspects of the present disclosure. Wireless device 1205 may be an example of aspects of a transmitting wireless device, such as a transmitter 605, transmitter 705, or transmitter 805 as described with reference to FIG. 6, 7, or 8, respectively. Wireless device 1205 may include receiver 1210, ranging sounding signal manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to protection of ranging sounding signals from physical level attacks, etc.). Information may be passed on to other components of the device. The receiver 1210 may be an example of aspects of the transceiver 1535 described with reference to FIG. 15. The receiver 1210 may utilize a single antenna or a set of antennas.

Ranging sounding signal manager 1215 may be an example of aspects of the ranging sounding signal manager 1515 described with reference to FIG. 15. Ranging sounding signal manager 1215 and/or at least some of its various sub-components may be implemented in hardware, software executed by a processor, firmware, or any combination thereof. If implemented in software executed by a processor, the functions of the ranging sounding signal manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The ranging sounding signal manager 1215 and/or at least some of its various sub-components may be physically located at different locations, including being distributed such that portions of functions are implemented at different physical locations by one or more physical devices. In some examples, ranging sounding signal manager 1215 and/or at least some of its various sub-components may be a separate and distinct component in accordance with various aspects of the present disclosure. In other examples, ranging sounding signal manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Ranging sounding signal manager 1215 may encode an LTF of a sounding training signal, where the encoding includes applying a phase rotation to the LTF and the phase rotation is from a sequence of phase rotations. In such cases, a per-tone phase rotation may be applied to values of an LTF base sequence. In other examples, the phase rotation may be applied to tones in a frequency domain estimate of a set of generated OFDM symbols. Additionally or alternatively, different phase rotations may be applied to a set of generated OFDM symbols of the sounding training signal.

In some examples, ranging sounding signal manager 1215 may configure an extension field of the sounding training signal to include an indication of the encoding and transmit the sounding training signal including the encoded LTF and the configured extension field. Additionally or alternatively, the ranging sounding signal manager 1215 may identify a first cyclic delay shift for a first sounding training signal used for a ranging sounding estimation, encode modulation symbols of the first sounding training signal, where the modulation symbols are each encoded with the identified first cyclic delay shift, and transmit the first sounding training signal. In some examples, the ranging sounding signal manager 1215 may also generate a frame for a ranging sounding estimation, the frame including a sounding training signal that is time shifted to occur after a measurement part of the frame, the generating being based at least in part on a time offset that is applied to one or more fields of the frame, and transmit the generated frame including the sounding training signal.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
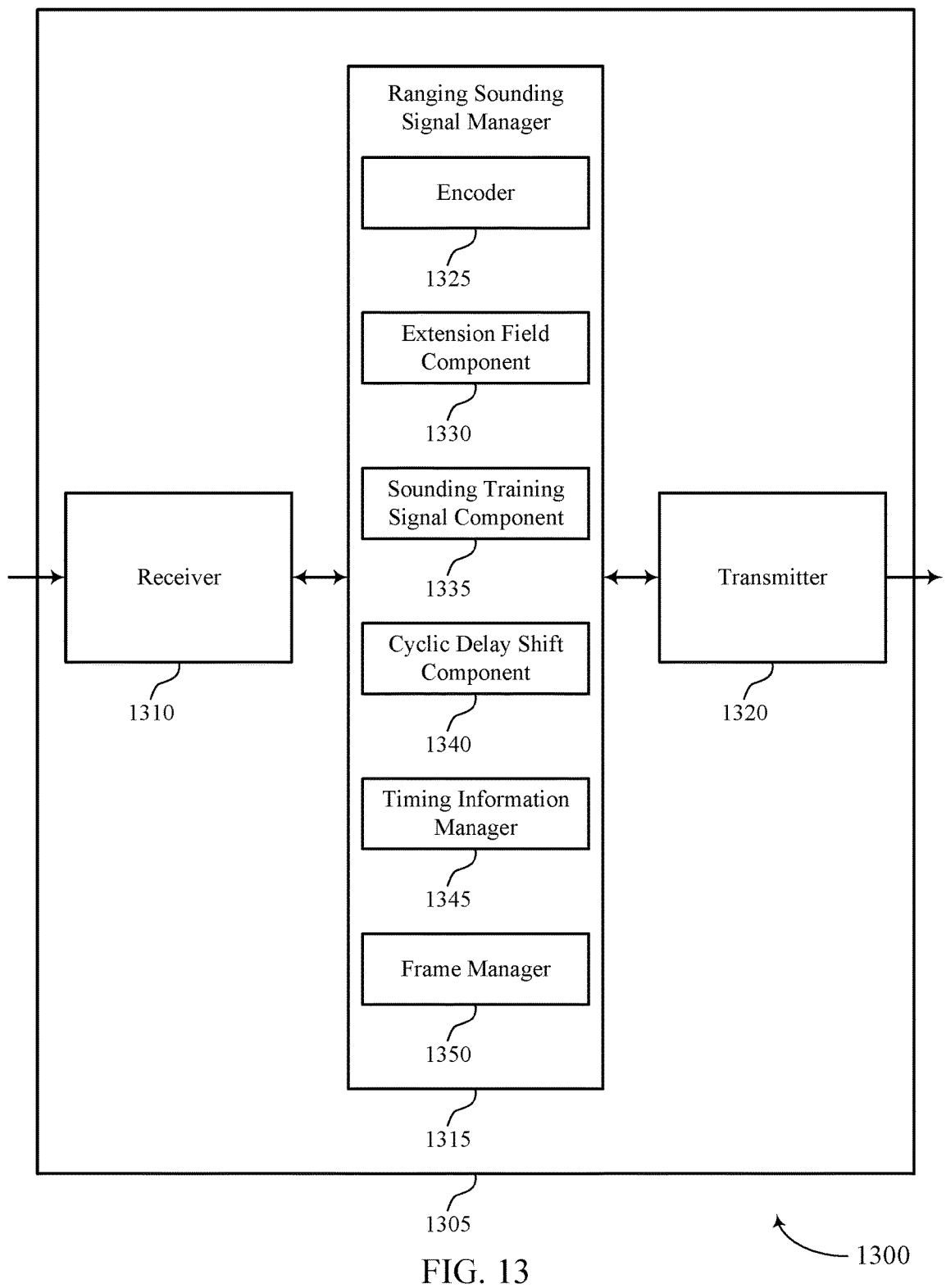

FIG. 13 shows a block diagram 1300 of a wireless device 1305 that supports protection of ranging sounding signals from physical level attacks in accordance with aspects of the present disclosure. Wireless device 1305 may be an example of aspects of a wireless device 1205 as described with reference to FIG. 12 or a transmitting wireless device such as a transmitter 605, transmitter 705, or transmitter 805 as described with reference to FIG. 6, 7, or 8, respectively. Wireless device 1305 may include receiver 1310, ranging sounding signal manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to protection of ranging sounding signals from physical level attacks, etc.). Information may be passed on to other components of the device. The receiver 1310 may be an example of aspects of the transceiver 1535 described with reference to FIG. 15. The receiver 1310 may utilize a single antenna or a set of antennas.

Ranging sounding signal manager 1315 may be an example of aspects of the ranging sounding signal manager 1515 described with reference to FIG. 15. Ranging sounding signal manager 1315 may also include encoder 1325, extension field component 1330, sounding training signal component 1335, cyclic delay shift component 1340, timing information manager 1345, and frame manager 1350.

Encoder 1325 may encode an LTF of a sounding training signal, where the encoding includes applying a phase rotation to the LTF and encode modulation symbols of the first sounding training signal, where the modulation symbols are each encoded with the identified first cyclic delay shift. Additionally or alternatively, the LTF is encoded using a phase rotation applied to an LTF base sequence, where the phase rotation is from a sequence of phase rotations associated with different phase rotations of respective tones.

Extension field component 1330 may configure an extension field of the sounding training signal to include an indication of the encoding. In some cases, the extension field is transmitted after the LTF. In some cases, the extension field of the sounding training signal includes a packet extension field modulated according to a legacy portion of a frame.

Sounding training signal component 1335 may transmit the sounding training signal including the encoded LTF and the configured extension field and transmit a second LTF of a second sounding training signal, the second LTF encoded using a second phase rotation from the sequence of phase rotations, where the second phase rotation is different from the phase rotation. In some cases, sounding training signal component 1335 may transmit the first sounding training signal, transmit a second sounding training signal including modulation symbols that are each encoded with a second cyclic delay shift, the second cyclic delay shift being different from the first cyclic delay shift, and transmit the time-shifted sounding training signal. In some cases, the sounding training signal is included in a null data packet frame.

Cyclic delay shift component 1340 may identify a first cyclic delay shift for a first sounding training signal used for a ranging sounding estimation and transmit an indication of the first cyclic delay shift before transmitting an LTF of the first sounding training signal, where the indication of the first cyclic delay shift is encrypted. In some cases, cyclic delay shift component 1340 may transmit an indication of the first cyclic delay shift after transmitting an LTF of the first sounding training signal, where the indication of the first cyclic delay shift is transmitted in a packet extension field modulated according to a legacy portion of a frame.

Timing information manager 1345 may omit timing information for at least a portion of one or more fields located before an LTF of a frame, or may remove all of the one or more fields located before the LTF. In some cases, timing information manager 1345 may omit the timing information from one or more fields of a frame, which may include splitting a frame into a first frame and a second frame, where the second frame includes a training signal corresponding to the time-shifted sounding training signal, and the second frame may be offset from the first frame by a time-offset delay. In some cases, omitting the timing information includes omitting the timing information from a short training field of the frame, where the timing information may, for example, be replaced with a set of arbitrary symbols, or by including no symbols in place of the timing information.

Frame manager 1350 may generate the frame including a time-shifted sounding training signal for a ranging sounding estimation based on a timing offset associated with timing information that is contained in one or more fields of a frame, transmit the first frame and the second frame, and apply a power adjustment to the frame including the time-shifted sounding training signal based on the measured signal strength. In some cases, the frame includes a fine timing measurement frame or a null data packet frame. In some cases, the timing information is in a location that is different from one or more fields located before a long training field of the frame. In some examples, the timing information is located after the long training field of the frame.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
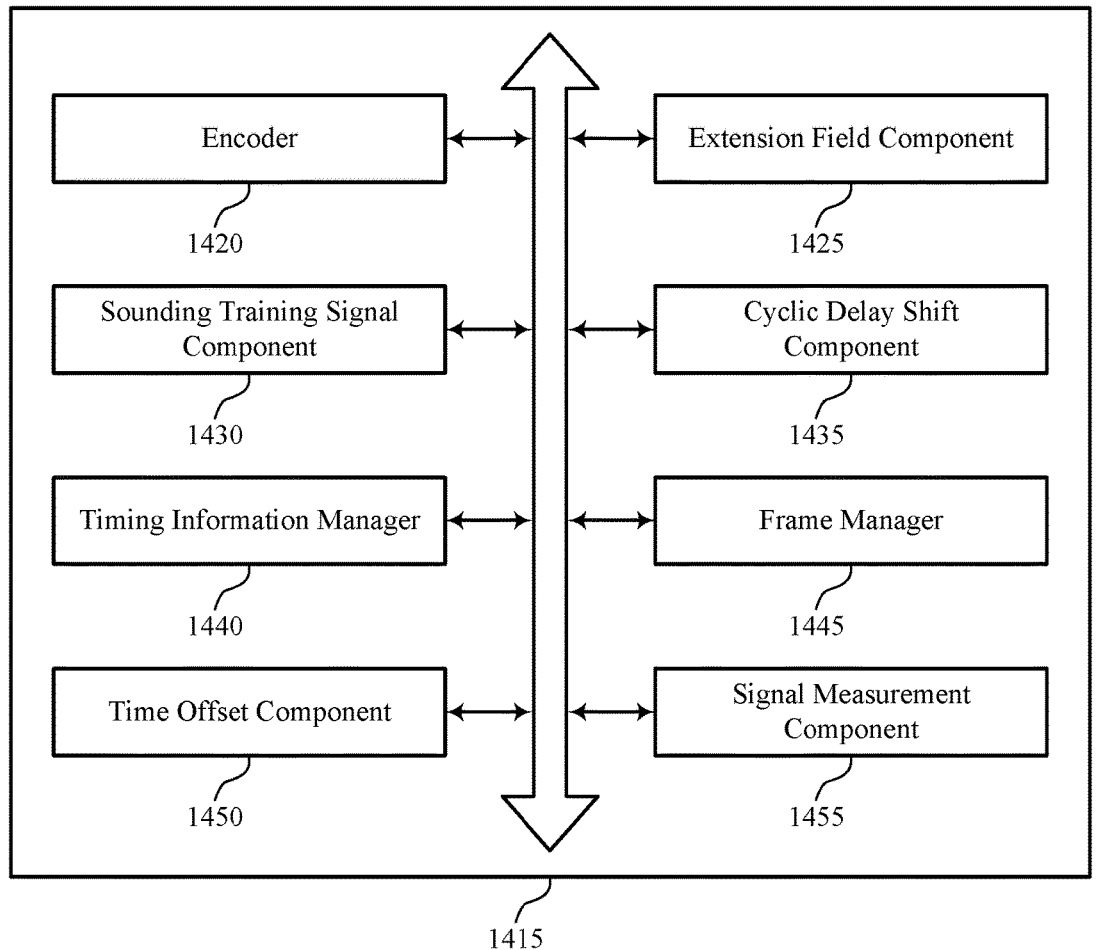
FIG. 14 shows a block diagrams of a ranging sounding signal manager that supports protection of ranging sounding signals from physical level attacks in accordance with aspects of the present disclosure.

FIG. 14 shows a block diagram 1400 of a ranging sounding signal manager 1415 that supports protection of ranging sounding signals from physical level attacks in accordance with aspects of the present disclosure. The ranging sounding signal manager 1415 may be an example of aspects of a ranging sounding signal manager 1515 described with reference to FIGS. 12, 13, and 15. The ranging sounding signal manager 1415 may include encoder 1420, extension field component 1425, sounding training signal component 1430, cyclic delay shift component 1435, timing information manager 1440, frame manager 1445, time offset component 1450, and signal measurement component 1455. Each of these modules may communicate, directly or indirectly, with one another (e.g., via one or more buses).

Encoder 1420 may encode an LTF of a sounding training signal, where the encoding includes applying a phase rotation to the LTF and encode modulation symbols of the first sounding training signal, where the modulation symbols are each encoded with the identified first cyclic delay shift. In some cases, the LTF is encoded using the phase rotation applied to an LTF base sequence, and where the phase rotation is from a sequence of phase rotations associated with different phase rotations of respective tones. In some examples, the long training field is encoded using the phase rotation applied to tones of a set of modulation symbols of the sounding training signal, and the phase rotation is from a sequence of phase rotations associated with different phase rotations of respective tones.

Extension field component 1425 may configure an extension field of the sounding training signal to include an indication of the encoding. In some cases, the extension field is transmitted after the LTF. In some cases, the extension field of the sounding training signal includes a packet extension field modulated according to a legacy portion of a frame.

Sounding training signal component 1430 may transmit the sounding training signal including the encoded LTF and the configured extension field and transmit a second LTF of a second sounding training signal, the second LTF encoded using a second phase rotation from the sequence of phase rotations, where the second phase rotation is different from the phase rotation. In some cases, sounding training signal component 1430 may transmit the first sounding training signal, transmit a second sounding training signal including modulation symbols that are each encoded with a second cyclic delay shift, the second cyclic delay shift being different from the first cyclic delay shift, and transmit the time-shifted sounding training signal. In some cases, the sounding training signal is included in a null data packet frame.

Cyclic delay shift component 1435 may identify a first cyclic delay shift for a first sounding training signal used for a ranging sounding estimation and transmit an indication of the first cyclic delay shift before transmitting an LTF of the first sounding training signal, where the indication of the first cyclic delay shift is encrypted. In some cases, cyclic delay shift component 1435 may transmit an indication of the first cyclic delay shift after transmitting an LTF of the first sounding training signal, where the indication of the first cyclic delay shift is transmitted in a packet extension field modulated according to a legacy portion of a frame.

Timing information manager 1440 may omit timing information for at least a portion of one or more fields located before an LTF of a frame, or may remove all of the one or more fields located before the LTF. In some cases, omitting the timing information includes splitting a frame into a first frame and a second frame, where the second frame includes a training signal corresponding to the time-shifted sounding training signal, and the second frame may be offset from the first frame by a time-offset delay. In some cases, omitting the timing information includes omitting the timing information from a short training field of the frame, where the timing information may, for example, be replaced with a set of arbitrary symbols, or by including no symbols in place of the timing information.

Frame manager 1445 may generate the frame including a time-shifted sounding training signal for a ranging sounding estimation based on a timing offset of the timing information, transmit the first frame and the second frame, and apply a power adjustment to the frame including the time-shifted sounding training signal based on the measured signal strength. In some cases, the frame includes a fine timing measurement frame or a null data packet frame. Time offset component 1450 may append a time offset to a short interframe space before the frame and transmit an encrypted indication of the time offset. Signal measurement component 1455 may measure a signal strength of a preceding frame that is transmitted before the time-shifted sounding training signal.

Figure 15:
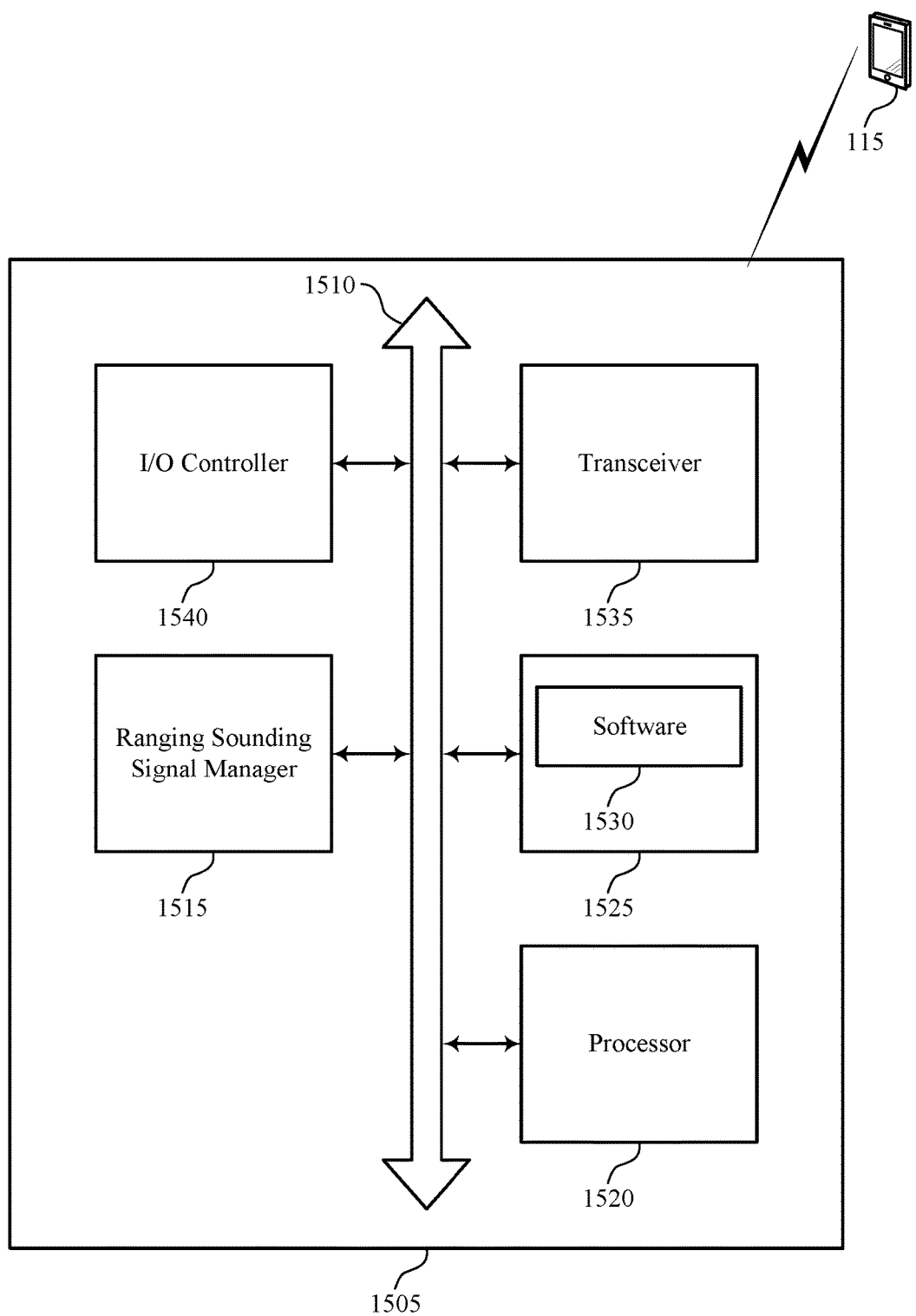
FIG. 15 illustrates a block diagram of a system including a wireless device that supports protection of ranging sounding signals from physical level attacks in accordance with aspects of the present disclosure.

FIG. 15 shows a diagram of a system 1500 including a wireless device 1505 that supports protection of ranging sounding signals from physical level attacks in accordance with aspects of the present disclosure. Wireless device 1505 may be an example of or include the components of wireless device 905, wireless device 1005, wireless device 1205, or wireless device 1305, as described with reference to FIGS. 9, 10, 12, and 13, or a transmitter 605, transmitter 705, or transmitter 805 as described with reference to FIG. 6, 7, or 8, respectively. Wireless device 1505 may include components for bi-directional voice and data communications including components for transmitting and receiving communications, including ranging sounding signal manager 1515, processor 1520, memory 1525, software 1530, transceiver 1535, and I/O controller 1540. These components may be in electronic communication via one or more busses (e.g., bus 1510).

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting protection of ranging sounding signals from physical level attacks).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement aspects of the present disclosure, including code to support protection of ranging sounding signals from physical level attacks. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

I/O controller 1540 may manage input and output signals for wireless device 1505. I/O controller 1540 may also manage peripherals not integrated into wireless device 1505. In some cases, I/O controller 1540 may represent a physical connection or port to an external peripheral. In some cases, I/O controller 1540 may utilize an operating system such as iOS®, ANDROID®, MS-DOS®, MS-WINDOWS®, OS/2®, UNIX®, LINUX®, or another known operating system. In other cases, I/O controller 1540 may represent or interact with a modem, a keyboard, a mouse, a touchscreen, or a similar device. In some cases, I/O controller 1540 may be implemented as part of a processor. In some cases, a user may interact with wireless device 1505 via I/O controller 1540 or via hardware components controlled by I/O controller 1540.

Figure 16:
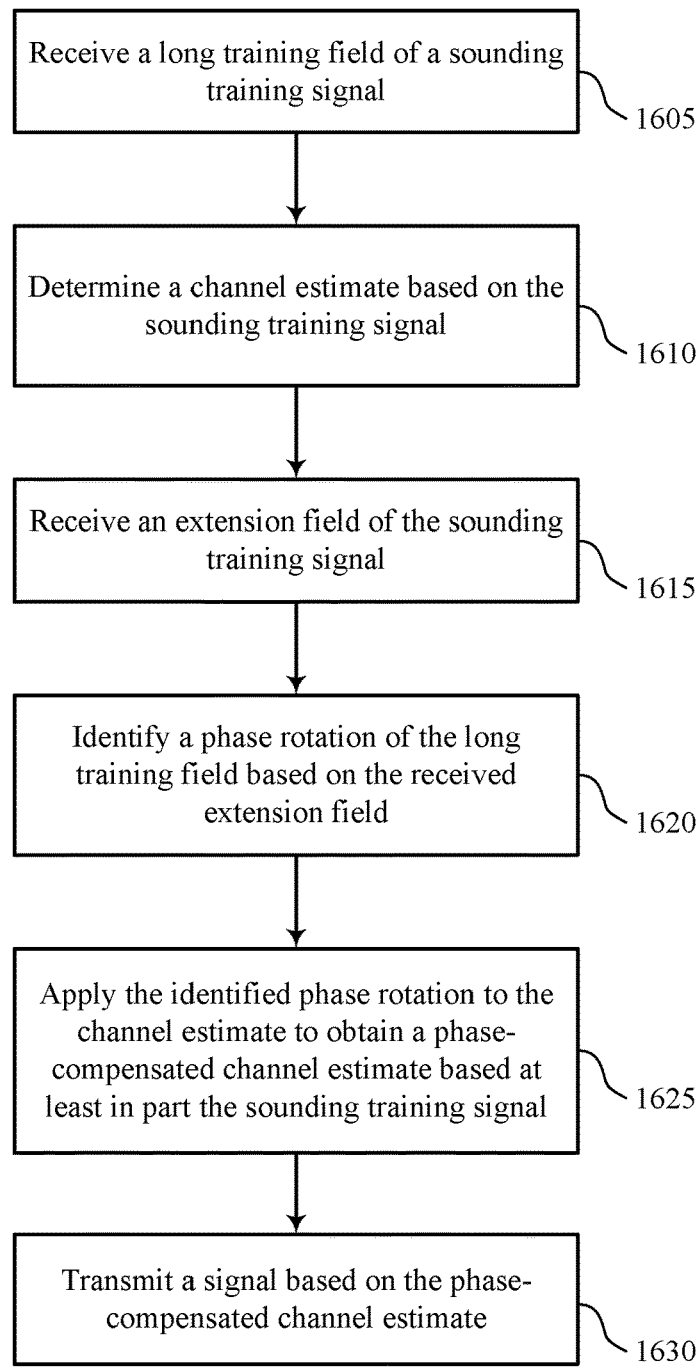
FIGS. 16 through 24 illustrate methods for protection of ranging sounding signals from physical level attacks in accordance with aspects of the present disclosure.

FIG. 16 shows a flowchart illustrating a method 1600 for protection of ranging sounding signals from physical level attacks in accordance with aspects of the present disclosure. The operations of method 1600 may be implemented by a wireless device (e.g., a receiving wireless device) or its components as described herein. For example, the operations of method 1600 may be performed by a ranging sounding signal manager as described with reference to FIGS. 9, 10, 11, and 15. In some examples, a wireless device may execute a set of codes to control the functional elements of the device to perform the functions described below. Additionally or alternatively, the wireless device may perform aspects of the functions described below using special-purpose hardware.

At block 1605 the wireless device may receive an LTF of a sounding training signal. The operations of block 1605 may be performed according to the methods described herein. In certain examples, aspects of the operations of block 1605 may be performed by a sounding training signal manager as described with reference to FIGS. 9 through 11.

At block 1610 the wireless device may determine a channel estimate using a channel estimation procedure based at least in part on the sounding training signal. The operations of block 1610 may be performed according to the methods described herein. In certain examples, aspects of the operations of block 1610 may be performed by a channel estimate manager as described with reference to FIGS. 9 through 11.

At block 1615 the wireless device may receive an extension field of the sounding training signal. The operations of block 1615 may be performed according to the methods described herein. In certain examples, aspects of the operations of block 1615 may be performed by a sounding training signal manager as described with reference to FIGS. 9 through 11.

At block 1620 the wireless device may identify a phase rotation of the LTF based at least in part on demodulating the received extension field. The operations of block 1620 may be performed according to the methods described herein. In certain examples, aspects of the operations of block 1620 may be performed by a phase rotation component as described with reference to FIGS. 9 through 11.

At block 1625 the wireless device may apply the identified phase rotation to the channel estimate to obtain a phase-compensated channel estimate based on the sounding training signal. The operations of block 1625 may be performed according to the methods described herein. In certain examples, aspects of the operations of block 1625 may be performed by a channel estimate manager as described with reference to FIGS. 9 through 11.

At block 1630 the wireless device may transmit a signal based on the phase-compensated channel estimate. The operations of block 1630 may be performed according to the methods described herein. In certain examples, aspects of the operations of block 1630 may be performed by a channel estimate manager as described with reference to FIGS. 9 through 11.

Figure 17:
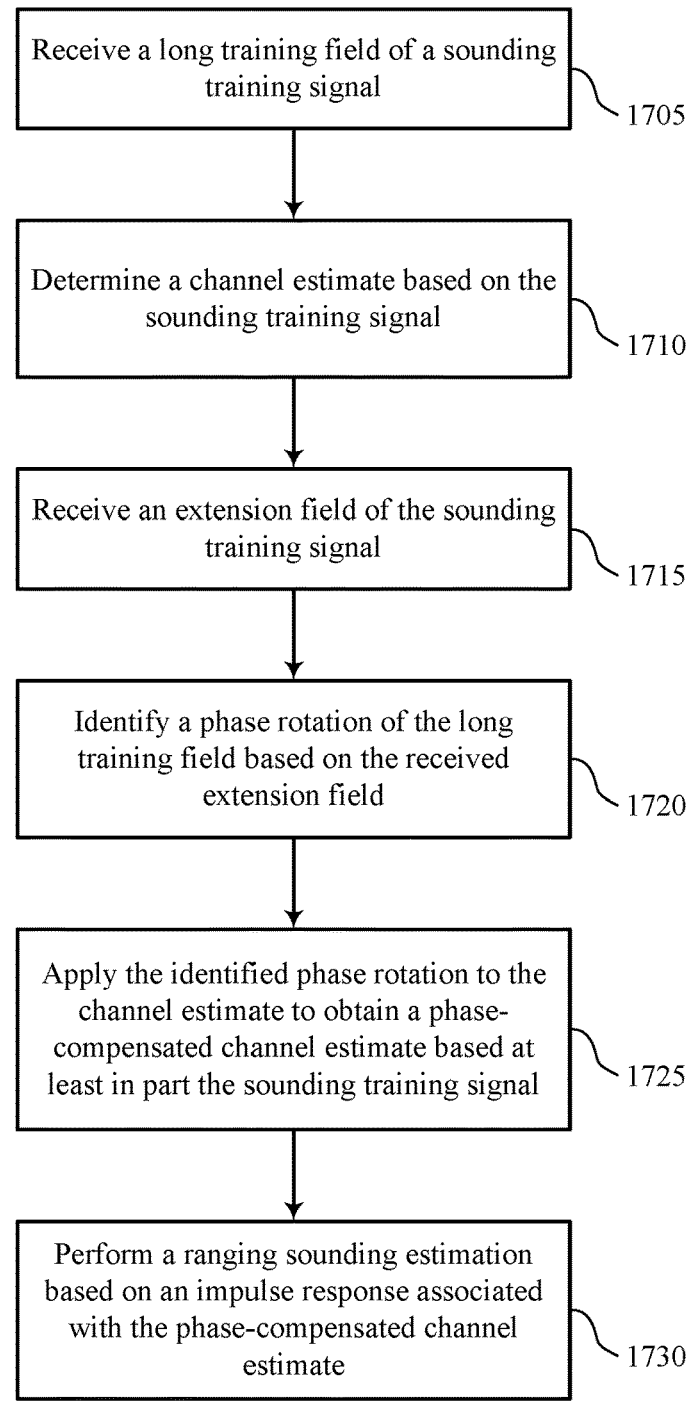

FIG. 17 shows a flowchart illustrating a method 1700 for protection of ranging sounding signals from physical level attacks in accordance with aspects of the present disclosure. The operations of method 1700 may be implemented by a wireless device (e.g., a receiving wireless device) or its components as described herein. For example, the operations of method 1700 may be performed by a ranging sounding signal manager as described with reference to FIGS. 9, 10, 11, and 15. In some examples, a wireless device may execute a set of codes to control the functional elements of the device to perform the functions described below. Additionally or alternatively, the wireless device may perform aspects of the functions described below using special-purpose hardware.

At block 1705 the wireless device may receive an LTF of a sounding training signal. The operations of block 1705 may be performed according to the methods described herein. In certain examples, aspects of the operations of block 1705 may be performed by a sounding training signal manager as described with reference to FIGS. 9 through 11.

At block 1710 the wireless device may determine a channel estimate using a channel estimation procedure based at least in part on the sounding training signal. The operations of block 1710 may be performed according to the methods described herein. In certain examples, aspects of the operations of block 1710 may be performed by a channel estimate manager as described with reference to FIGS. 9 through 11.

At block 1715 the wireless device may receive an extension field of the sounding training signal. The operations of block 1715 may be performed according to the methods described herein. In certain examples, aspects of the operations of block 1715 may be performed by a sounding training signal manager as described with reference to FIGS. 9 through 11.

At block 1720 the wireless device may identify a phase rotation of the LTF based at least in part on demodulating the received extension field. The operations of block 1720 may be performed according to the methods described herein. In certain examples, aspects of the operations of block 1720 may be performed by a phase rotation component as described with reference to FIGS. 9 through 11.

At block 1725 the wireless device may apply the identified phase rotation to the channel estimate to obtain a phase-compensated channel estimate based on the sounding training signal. The operations of block 1725 may be performed according to the methods described herein. In certain examples, aspects of the operations of block 1725 may be performed by a channel estimate manager as described with reference to FIGS. 9 through 11.

At block 1730 the wireless device may perform a ranging sounding estimation based at least in part on an impulse response associated with the phase-compensated channel estimate. The operations of block 1730 may be performed according to the methods described herein. In certain examples, aspects of the operations of block 1730 may be performed by a ranging sounding estimation component as described with reference to FIGS. 9 through 11.

Figure 18:
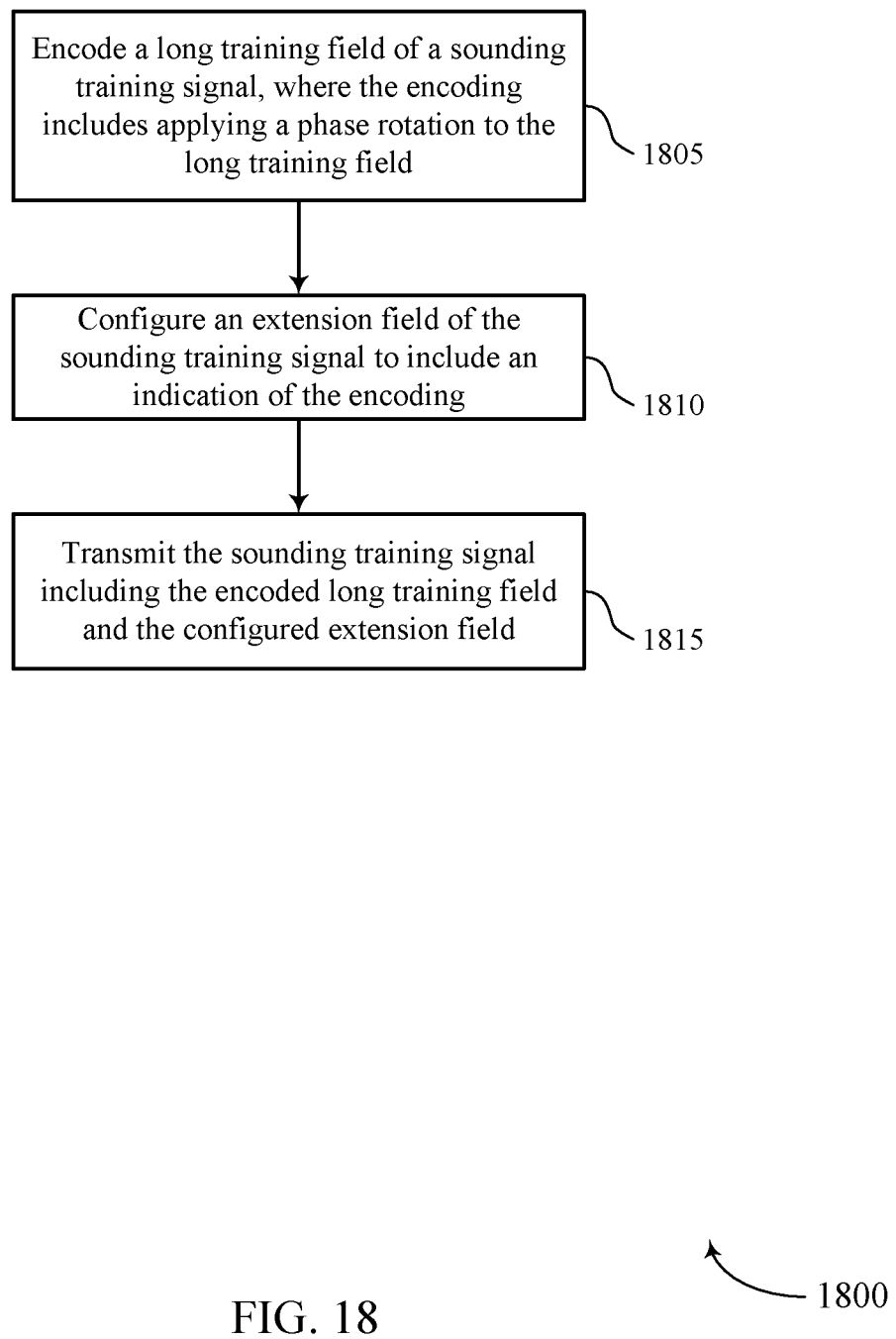

FIG. 18 shows a flowchart illustrating a method 1800 for protection of ranging sounding signals from physical level attacks in accordance with aspects of the present disclosure. The operations of method 1800 may be implemented by a wireless device (e.g., a transmitting wireless device) or its components as described herein. For example, the operations of method 1800 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 1805 the wireless device may encode an LTF of a sounding training signal, where the encoding includes applying a phase rotation to the LTF. The operations of block 1805 may be performed according to the methods described herein. In certain examples, aspects of the operations of block 1805 may be performed by a encoder as described with reference to FIGS. 12 through 15.

At block 1810 the wireless device may configure an extension field of the sounding training signal to include an indication of the encoding. The operations of block 1810 may be performed according to the methods described herein. In certain examples, aspects of the operations of block 1810 may be performed by an extension field component as described with reference to FIGS. 12 through 15.

At block 1815 the wireless device may transmit the sounding training signal including the encoded LTF and the configured extension field. The operations of block 1815 may be performed according to the methods described herein. In certain examples, aspects of the operations of block 1815 may be performed by a sounding training signal component as described with reference to FIGS. 12 through 15.

Figure 19:
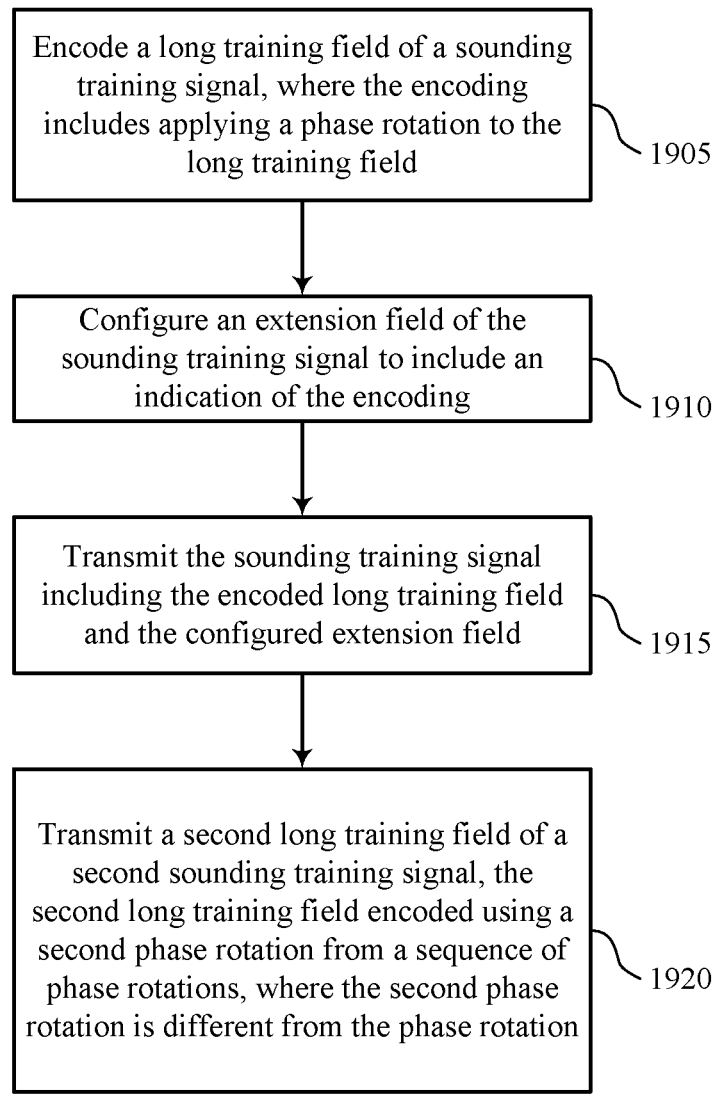

FIG. 19 shows a flowchart illustrating a method 1900 for protection of ranging sounding signals from physical level attacks in accordance with aspects of the present disclosure. The operations of method 1900 may be implemented by a wireless device (e.g., a transmitting wireless device) or its components as described herein. For example, the operations of method 1900 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 1905 the wireless device may encode an LTF of a sounding training signal, where the encoding includes applying a phase rotation to the LTF. The operations of block 1905 may be performed according to the methods described herein. In certain examples, aspects of the operations of block 1905 may be performed by a encoder as described with reference to FIGS. 12 through 15.

At block 1910 the wireless device may configure an extension field of the sounding training signal to include an indication of the encoding. The operations of block 1910 may be performed according to the methods described herein. In certain examples, aspects of the operations of block 1910 may be performed by an extension field component as described with reference to FIGS. 12 through 15.

At block 1915 the wireless device may transmit the sounding training signal including the encoded LTF and the configured extension field. The operations of block 1915 may be performed according to the methods described herein. In certain examples, aspects of the operations of block 1915 may be performed by a sounding training signal component as described with reference to FIGS. 12 through 15.

At block 1920 the wireless device may transmit a second LTF of a second sounding training signal, the second LTF encoded using a second phase rotation from a sequence of phase rotations, where the second phase rotation is different from the phase rotation. The operations of block 1920 may be performed according to the methods described herein. In certain examples, aspects of the operations of block 1920 may be performed by a sounding training signal component as described with reference to FIGS. 12 through 15.

Figure 20:
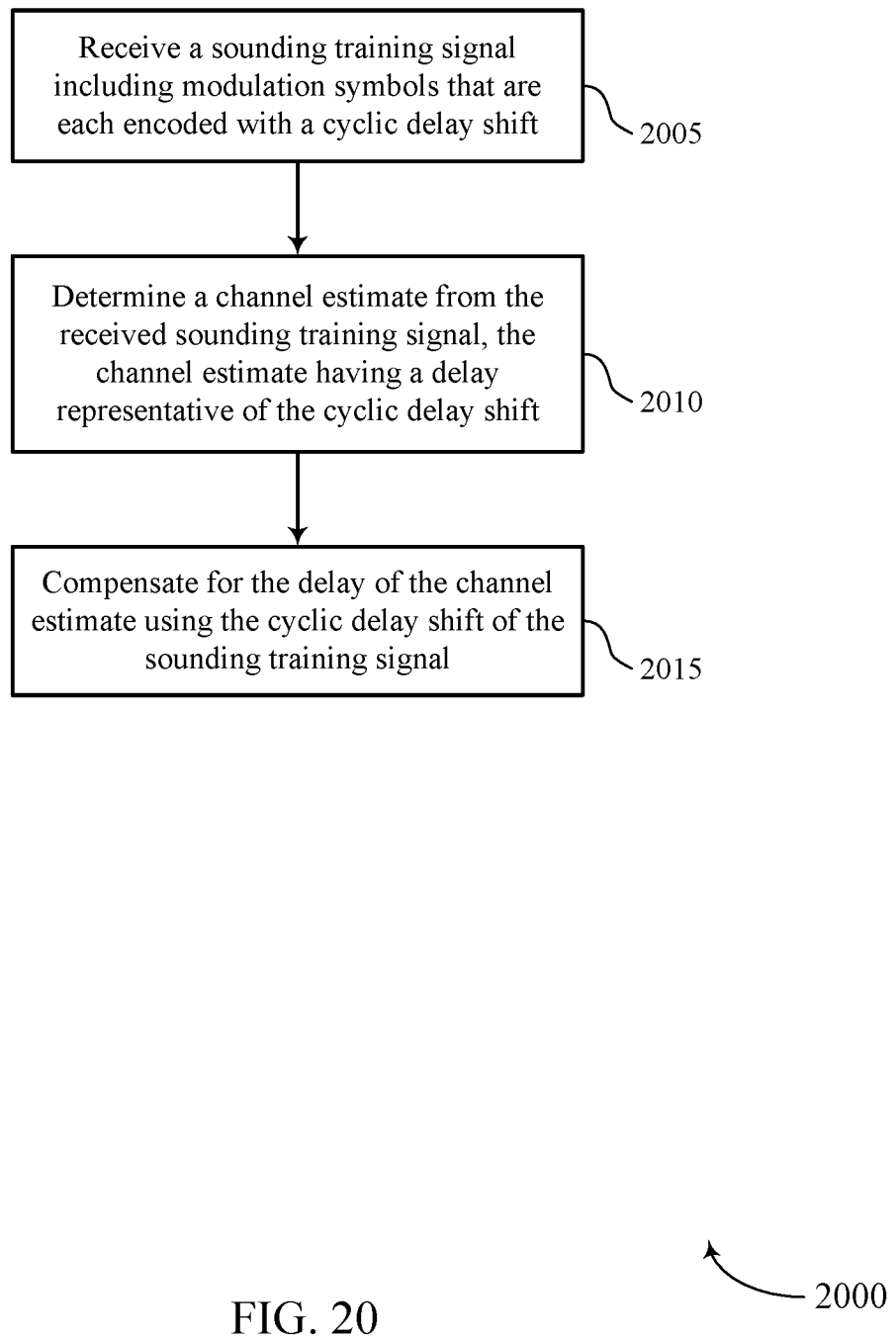

FIG. 20 shows a flowchart illustrating a method 2000 for protection of ranging sounding signals from physical level attacks in accordance with aspects of the present disclosure. The operations of method 2000 may be implemented by a wireless device (e.g., a receiving wireless device) or its components as described herein. For example, the operations of method 2000 may be performed by a ranging sounding signal manager as described with reference to FIGS. 9, 10, 11, and 15. In some examples, a wireless device may execute a set of codes to control the functional elements of the device to perform the functions described below. Additionally or alternatively, the wireless device may perform aspects of the functions described below using special-purpose hardware.

At block 2005 the wireless device may receive a sounding training signal including modulation symbols that are each encoded with a cyclic delay shift. The operations of block 2005 may be performed according to the methods described herein. In certain examples, aspects of the operations of block 2005 may be performed by a sounding training signal manager as described with reference to FIGS. 9 through 11.

At block 2010 the wireless device may determine a channel estimate from the received sounding training signal, the channel estimate having a delay representative of the cyclic delay shift. The operations of block 2010 may be performed according to the methods described herein. In certain examples, aspects of the operations of block 2010 may be performed by a channel estimate manager as described with reference to FIGS. 9 through 11.

At block 2015 the wireless device may compensate for the delay of the channel estimate using the cyclic delay shift of the sounding training signal. The operations of block 2015 may be performed according to the methods described herein. In certain examples, aspects of the operations of block 2015 may be performed by a cyclic delay manager as described with reference to FIGS. 9 through 11.

Figure 21:
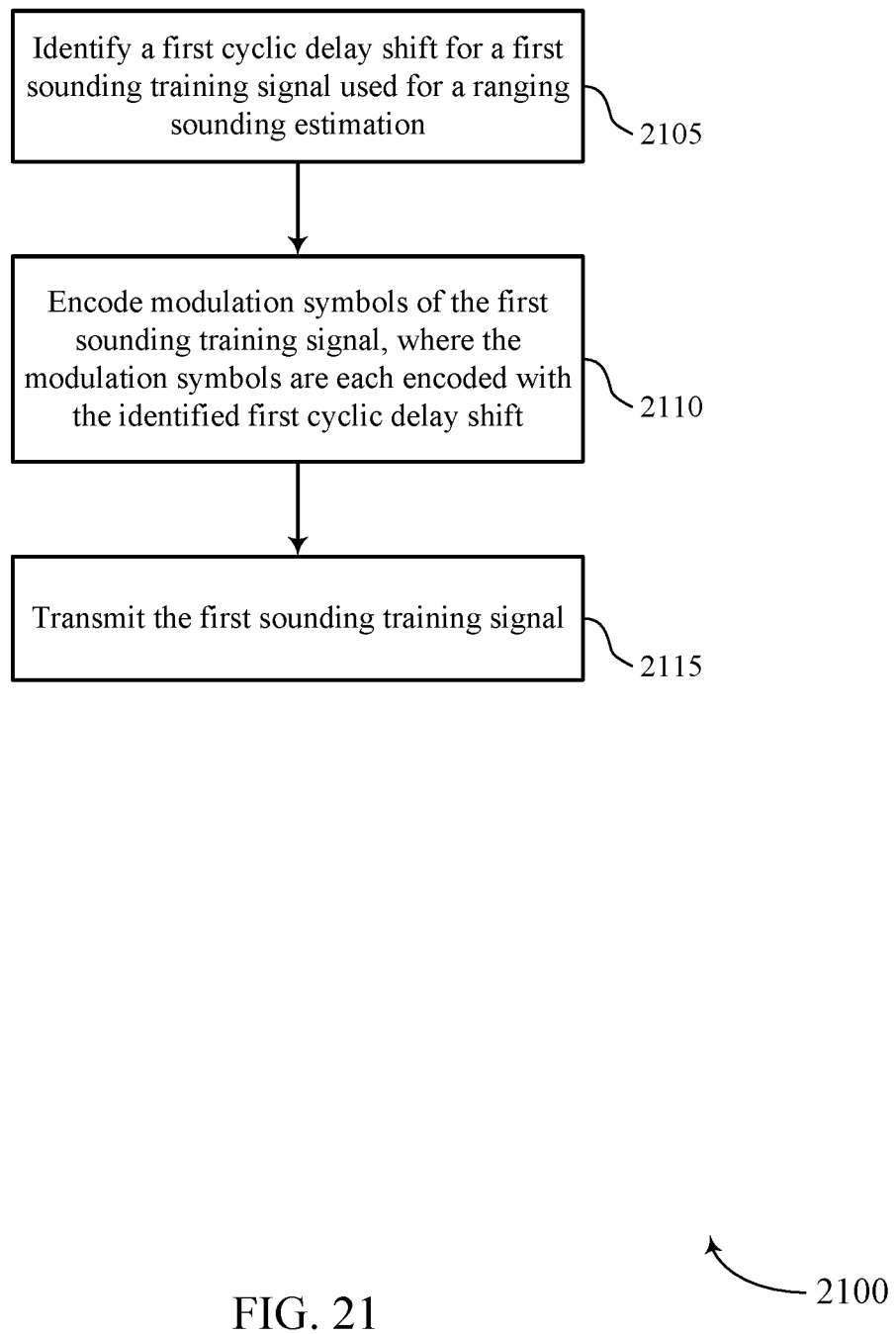

FIG. 21 shows a flowchart illustrating a method 2100 for protection of ranging sounding signals from physical level attacks in accordance with aspects of the present disclosure. The operations of method 2100 may be implemented by a wireless device (e.g., a transmitting wireless device) or its components as described herein. For example, the operations of method 2100 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 2105 the wireless device may identify a first cyclic delay shift for a first sounding training signal used for a ranging sounding estimation. The operations of block 2105 may be performed according to the methods described herein. In certain examples, aspects of the operations of block 2105 may be performed by a cyclic delay shift component as described with reference to FIGS. 12 through 15.

At block 2110 the wireless device may encode modulation symbols of the first sounding training signal, where the modulation symbols are each encoded with the identified first cyclic delay shift. The operations of block 2110 may be performed according to the methods described herein. In certain examples, aspects of the operations of block 2110 may be performed by a encoder as described with reference to FIGS. 12 through 15.

At block 2115 the wireless device may transmit the first sounding training signal. The operations of block 2115 may be performed according to the methods described herein. In certain examples, aspects of the operations of block 2115 may be performed by a sounding training signal component as described with reference to FIGS. 12 through 15.

Figure 22:
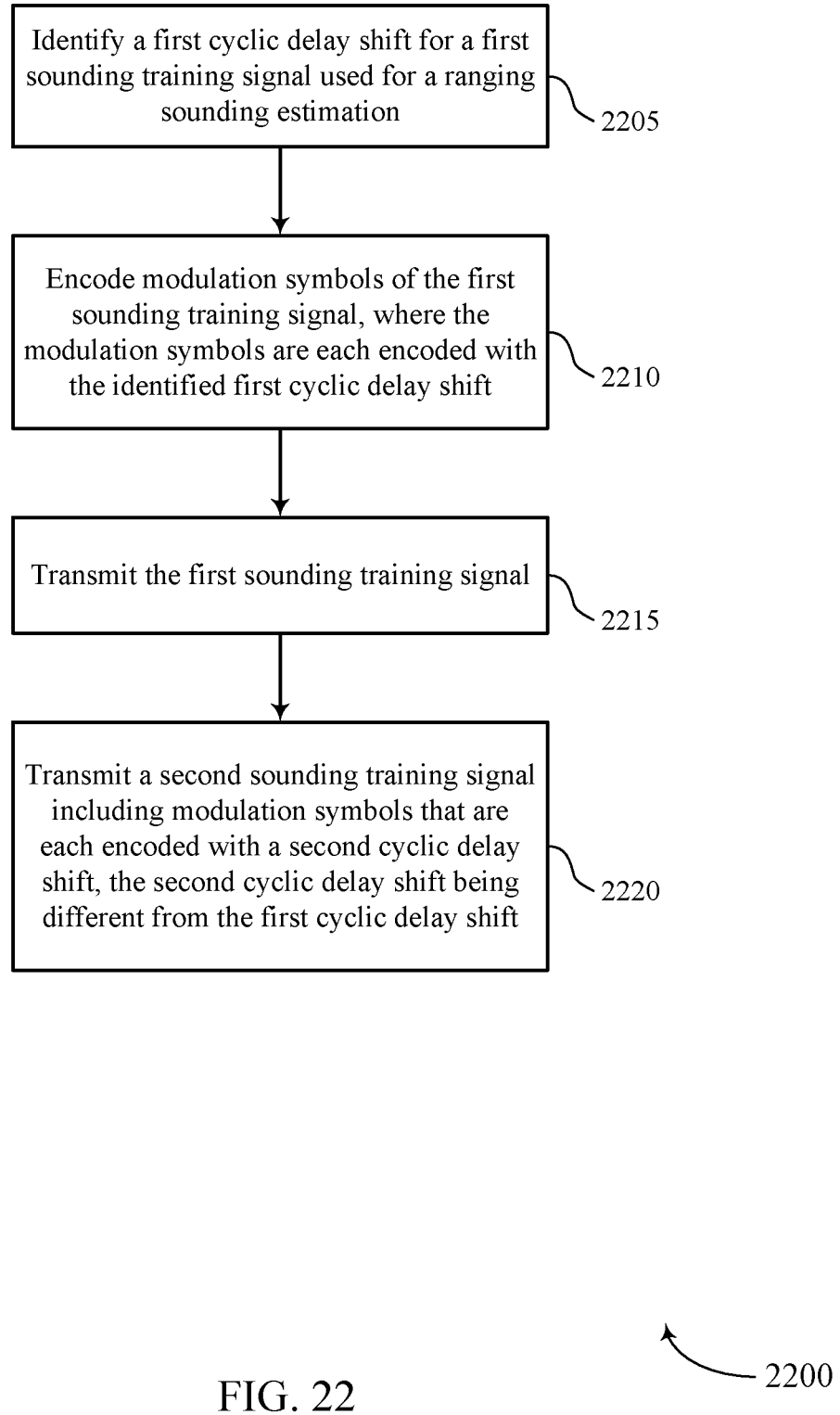

FIG. 22 shows a flowchart illustrating a method 2200 for protection of ranging sounding signals from physical level attacks in accordance with aspects of the present disclosure. The operations of method 2200 may be implemented by a wireless device (e.g., a transmitting wireless device) or its components as described herein. For example, the operations of method 2200 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 2205 the wireless device may identify a first cyclic delay shift for a first sounding training signal used for a ranging sounding estimation. The operations of block 2205 may be performed according to the methods described herein. In certain examples, aspects of the operations of block 2205 may be performed by a cyclic delay shift component as described with reference to FIGS. 12 through 15.

At block 2210 the wireless device may encode modulation symbols of the first sounding training signal, where the modulation symbols are each encoded with the identified first cyclic delay shift. The operations of block 2210 may be performed according to the methods described herein. In certain examples, aspects of the operations of block 2210 may be performed by a encoder as described with reference to FIGS. 12 through 15.

At block 2215 the wireless device may transmit the first sounding training signal. The operations of block 2215 may be performed according to the methods described herein. In certain examples, aspects of the operations of block 2215 may be performed by a sounding training signal component as described with reference to FIGS. 12 through 15.

At block 2220 the wireless device may transmit a second sounding training signal including modulation symbols that are each encoded with a second cyclic delay shift, the second cyclic delay shift being different from the first cyclic delay shift. That is, there may be a packet-by-packet varying time delay associated with transmissions of sounding training signals. The operations of block 2220 may be performed according to the methods described herein. In certain examples, aspects of the operations of block 2220 may be performed by a sounding training signal component as described with reference to FIGS. 12 through 15.

Figure 23:
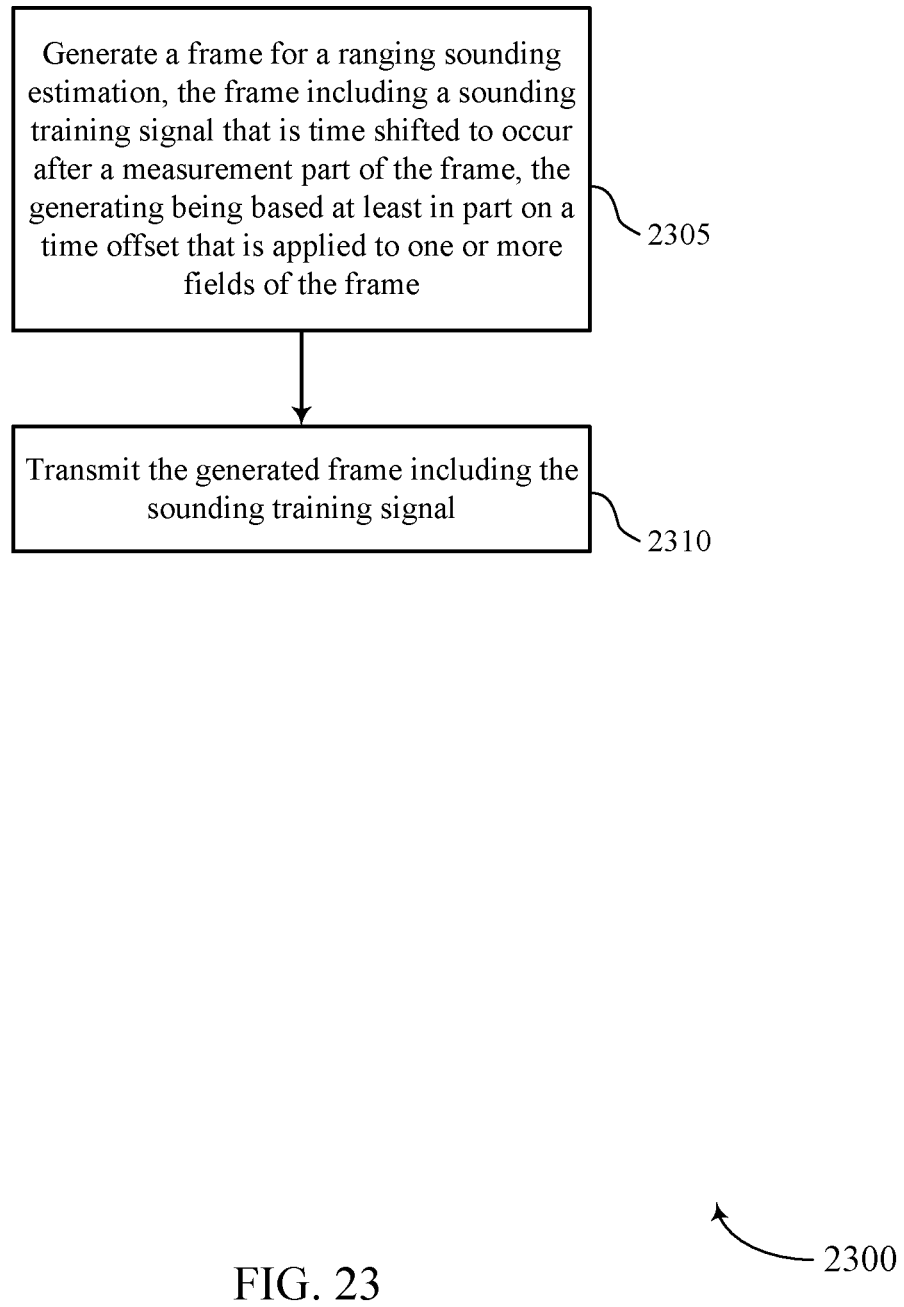

FIG. 23 shows a flowchart illustrating a method 2300 for protection of ranging sounding signals from physical level attacks in accordance with aspects of the present disclosure. The operations of method 2300 may be implemented by a wireless device (e.g., a transmitting wireless device) or its components as described herein. For example, the operations of method 2300 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 2305 the wireless device may generate a frame for a ranging sounding estimation, the frame including a sounding training signal that is time shifted to occur after a measurement part of the frame, the generating being based at least in part on a time offset that is applied to one or more fields of the frame. The operations of block 2305 may be performed according to the methods described herein. In certain examples, aspects of the operations of block 2305 may be performed by a frame manager as described with reference to FIGS. 12 through 15.

At block 2310 the wireless device may transmit the generated frame including the sounding training signal. The operations of block 2310 may be performed according to the methods described herein. In certain examples, aspects of the operations of block 2310 may be performed by a sounding training signal component as described with reference to FIGS. 12 through 15.

Figure 24:
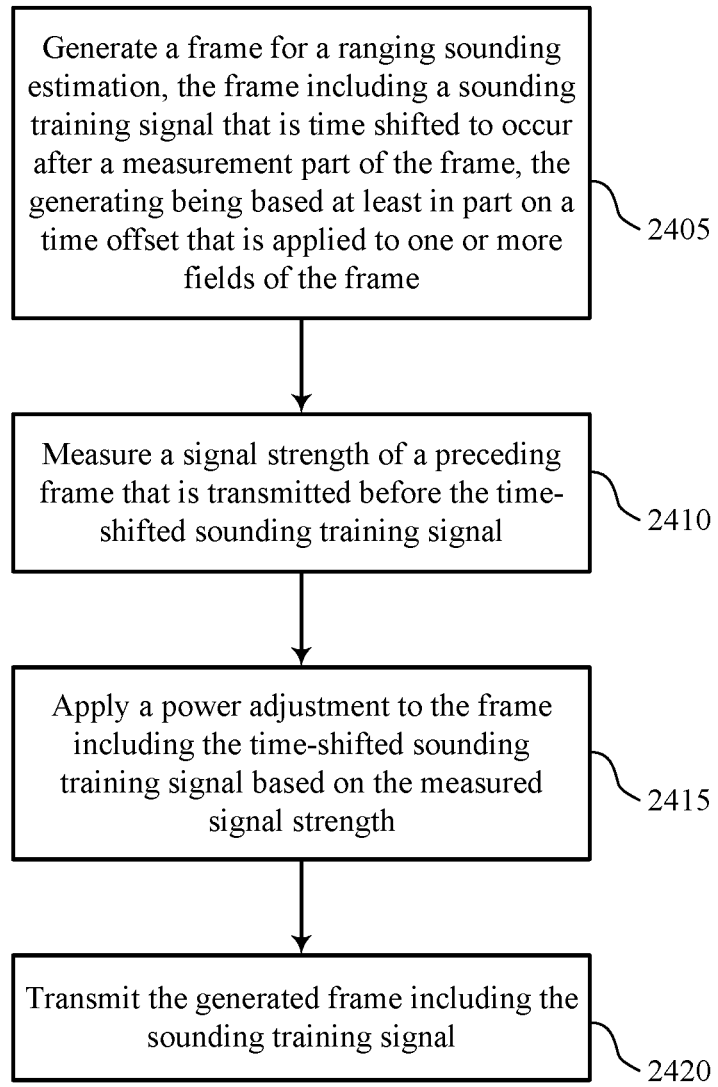

FIG. 24 shows a flowchart illustrating a method 2400 for protection of ranging sounding signals from physical level attacks in accordance with aspects of the present disclosure. The operations of method 2400 may be implemented by a wireless device (e.g., a transmitting wireless device) or its components as described herein. For example, the operations of method 2400 may be performed by a ranging sounding signal manager as described with reference to FIGS. 12 through 15. In some examples, a wireless device may execute a set of codes to control the functional elements of the device to perform the functions described below. Additionally or alternatively, the wireless device may perform aspects of the functions described below using special-purpose hardware.

At block 2405 the wireless device may generate a frame for a ranging sounding estimation, the frame including a sounding training signal that is time shifted to occur after a measurement part of the frame, the generating being based at least in part on a time offset that is applied to one or more fields of the frame. The operations of block 2405 may be performed according to the methods described herein. In certain examples, aspects of the operations of block 2405 may be performed by a frame manager as described with reference to FIGS. 12 through 15.

At block 2410 the wireless device may measure a signal strength of a preceding frame that is transmitted before the time-shifted sounding training signal. For example, the preceding frame may not have been transmitted by the wireless device. In such cases, the preceding frame may include a transmission power. The operations of block 2410 may be performed according to the methods described herein. In certain examples, aspects of the operations of block 2410 may be performed by a signal measurement component as described with reference to FIGS. 12 through 15.

At block 2415 the wireless device may apply a power adjustment to the frame including the time-shifted sounding training signal based at least in part on the measured signal strength. For example, if the preceding frame is not transmitted by the wireless device (e.g., transmitted by another wireless device), then power control may be applied to the frame including the time-shifted sounding training signal. The wireless device may compute what power the time-delayed frame may be transmitted at. The operations of block 2415 may be performed according to the methods described herein. In certain examples, aspects of the operations of block 2415 may be performed by a frame manager as described with reference to FIGS. 12 through 15.

At block 2420 the wireless device may transmit the generated frame including the sounding training signal. The operations of block 2420 may be performed according to the methods described herein. In certain examples, aspects of the operations of block 2420 may be performed by a sounding training signal component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at different locations, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

What is claimed is:

1. A method for wireless communication, comprising:
   encoding a long training field of a sounding training signal, wherein the encoding comprises applying a phase rotation to the long training field;
   configuring an extension field of the sounding training signal to include an indication of the encoding; and
   transmitting the sounding training signal including the encoded long training field and the configured extension field.

2. The method of claim 1, wherein the extension field is transmitted after the long training field.

3. The method of claim 1, wherein the long training field is encoded using the phase rotation applied to a long training field base sequence, and wherein the phase rotation is from a sequence of phase rotations associated with different phase rotations of respective tones.

4. The method of claim 3, further comprising transmitting a second long training field of a second sounding training signal, the second long training field encoded using a second phase rotation from the sequence of phase rotations, wherein the second phase rotation is different than the phase rotation.

5. The method of claim 1, wherein the extension field of the sounding training signal comprises a packet extension field modulated according to a legacy portion of a frame.

6. The method of claim 1, wherein the sounding training signal is included in a null data packet frame.

7. A method for wireless communication, comprising:
receiving a long training field of a sounding training signal;
determining a channel estimate based at least in part on the sounding training signal;
receiving an extension field of the sounding training signal;
identifying a phase rotation of the long training field based at least in part on the received extension field;
applying the identified phase rotation to the channel estimate to obtain a phase-compensated channel estimate based at least in part on the sounding training signal; and
transmitting a signal based on the phase-compensated channel estimate.

8. The method of claim 7, further comprising performing a ranging sounding estimation based at least in part on an impulse response associated with the phase-compensated channel estimate.

9. The method of claim 7, wherein the long training field is encoded using the phase rotation applied to a long training field base sequence, and wherein the phase rotation is from a sequence of phase rotations associated with different phase rotations of respective tones.

10. The method of claim 9, further comprising receiving a second long training field of a second sounding training signal, the second long training field encoded using a second phase rotation from the sequence of phase rotations, wherein the second phase rotation is different than the phase rotation.

11. The method of claim 7, wherein the long training field is encoded using the phase rotation applied to tones of a set of modulation symbols of the sounding training signal, and wherein the phase rotation is from a sequence of phase rotations associated with different phase rotations of respective tones.

12. The method of claim 7, further comprising storing the determined channel estimate before receiving the extension field of the sounding training signal.

13. The method of claim 7, wherein the extension field of the sounding training signal comprises a packet extension field modulated according to a legacy portion of a frame.

14. The method of claim 13, further comprising demodulating the packet extension field based at least in part on a legacy long training field of the legacy portion of the frame.

15. The method of claim 7, wherein the sounding training signal is included in a null data packet frame.

16. An apparatus for wireless communication, comprising:
a processor;
memory in electronic communication with the processor; and
instructions stored in the memory and operable, when executed by the processor, to cause the apparatus to:
encode a long training field of a sounding training signal, wherein the encoding comprises applying a phase rotation to the long training field;
configure an extension field of the sounding training signal to include an indication of the encoding; and
transmit the sounding training signal including the encoded long training field and the configured extension field.

17. The apparatus of claim 16, wherein the extension field is transmitted after the long training field.

18. The apparatus of claim 16, wherein the long training field is encoded using the phase rotation applied to a long training field base sequence, and wherein the phase rotation is from a sequence of phase rotations associated with different phase rotations of respective tones.

19. The apparatus of claim 18, wherein the instructions are executable by the processor to cause the apparatus to transmit a second long training field of a second sounding training signal, the second long training field encoded using a second phase rotation from the sequence of phase rotations, wherein the second phase rotation is different than the phase rotation.

20. The apparatus of claim 16, wherein the extension field of the sounding training signal comprises a packet extension field modulated according to a legacy portion of a frame.

21. The apparatus of claim 16, wherein the sounding training signal is included in a null data packet frame.

22. An apparatus for wireless communication, comprising:
a processor;
memory in electronic communication with the processor; and
instructions stored in the memory and operable, when executed by the processor, to cause the apparatus to:
receive a long training field of a sounding training signal;
determine a channel estimate based at least in part on the sounding training signal;
receive an extension field of the sounding training signal;
identify a phase rotation of the long training field based at least in part on the received extension field;
apply the identified phase rotation to the channel estimate to obtain a phase-compensated channel estimate based at least in part on the sounding training signal; and
transmit a signal based on the phase-compensated channel estimate.

23. The apparatus of claim 22, wherein the instructions are executable by the processor to cause the apparatus to perform a ranging sounding estimation based at least in part on an impulse response associated with the phase-compensated channel estimate.

24. The apparatus of claim 22, wherein the long training field is encoded using the phase rotation applied to a long training field base sequence, and wherein the phase rotation is from a sequence of phase rotations associated with different phase rotations of respective tones.

25. The apparatus of claim 24, wherein the instructions are executable by the processor to cause the apparatus to receive a second long training field of a second sounding training signal, the second long training field encoded using a second phase rotation from the sequence of phase rotations, wherein the second phase rotation is different than the phase rotation.

26. The apparatus of claim 22, wherein the long training field is encoded using the phase rotation applied to tones of a set of modulation symbols of the sounding training signal, and wherein the phase rotation is from a sequence of phase rotations associated with different phase rotations of respective tones.

27. The apparatus of claim 22, wherein the instructions are executable by the processor to cause the apparatus to store the determined channel estimate before receiving the extension field of the sounding training signal.

28. The apparatus of claim 22, wherein the extension field of the sounding training signal comprises a packet extension field modulated according to a legacy portion of a frame.

29. The apparatus of claim 28, wherein the instructions are executable by the processor to cause the apparatus to demodulate the packet extension field based at least in part on a legacy long training field of the legacy portion of the frame.

30. The apparatus of claim 22, wherein the sounding training signal is included in a null data packet frame.

* * * * *